(12) United States Patent
Tan et al.

(10) Patent No.: US 10,801,906 B2
(45) Date of Patent: Oct. 13, 2020

(54) HYDROGEL MICROPHONE

(71) Applicant: NUtech Ventures, Lincoln, NE (US)

(72) Inventors: Li Tan, Lincoln, NE (US); Yang Gao, Shaanxi (CN); Qin Zhou, Lincoln, NE (US); Yongmei Chen, Shaanxi (CN)

(73) Assignee: NUtech Ventures, Lincoln, NE (US)

( * ) Notice: Subject to any disclaimer, the term of this patent is extended or adjusted under 35 U.S.C. 154(b) by 38 days.

(21) Appl. No.: 15/812,267

(22) Filed: Nov. 14, 2017

(65) Prior Publication Data

US 2018/0136065 A1    May 17, 2018

Related U.S. Application Data

(60) Provisional application No. 62/421,941, filed on Nov. 14, 2016.

(51) Int. Cl.

| | |
|---|---|
| *G01L 9/00* | (2006.01) |
| *C08F 220/56* | (2006.01) |
| *C08K 3/28* | (2006.01) |
| *H04R 29/00* | (2006.01) |
| *H04R 19/04* | (2006.01) |
| *H04R 1/44* | (2006.01) |
| *H04R 31/00* | (2006.01) |
| *C08K 3/08* | (2006.01) |

(52) U.S. Cl.
CPC .......... *G01L 9/0095* (2013.01); *C08F 220/56* (2013.01); *C08K 3/08* (2013.01); *C08K 3/28* (2013.01); *H04R 1/44* (2013.01); *H04R 19/04* (2013.01); *H04R 29/004* (2013.01); *H04R 31/00* (2013.01); *C08K 2201/001* (2013.01); *C08K 2201/011* (2013.01)

(58) Field of Classification Search
CPC ......... G01L 1/14; G01L 1/142; G01L 9/0095; C08F 220/56; C08K 3/28; C08K 2201/001; H04R 1/44; H04R 19/04; H04R 29/004; H04R 31/00
USPC .......................................................... 73/780
See application file for complete search history.

(56) References Cited

U.S. PATENT DOCUMENTS

| | | | | |
|---|---|---|---|---|
| 4,515,162 | A * | 5/1985 | Yamamoto | A61B 5/04087 600/391 |
| 5,622,168 | A * | 4/1997 | Keusch | A61B 5/04085 252/500 |
| 5,665,490 | A | 9/1997 | Takeuchi et al. | |
| 6,310,762 | B1 | 10/2001 | Okamura et al. | |
| 7,920,129 | B2 | 4/2011 | Hotelling et al. | |
| 8,005,526 | B2 * | 8/2011 | Martin | A61B 5/0408 600/372 |

(Continued)

OTHER PUBLICATIONS

Keplinger et al., "Stretchable, Transparent, Ionic Conductors," Science, Aug. 2013, 341: 984-987.

(Continued)

*Primary Examiner* — Octavia Hollington
(74) *Attorney, Agent, or Firm* — Fish & Richardson P.C.

(57) ABSTRACT

A device includes a capacitive sensor having a hydrogel structure that includes a first surface and a second surface. A first electrode is provided at the first surface of the hydrogel structure, the first electrode including a network of conductive nanoparticles extending into the hydrogel structure. A second electrode is provided at the second surface of the hydrogel structure.

37 Claims, 18 Drawing Sheets

(56) References Cited

U.S. PATENT DOCUMENTS

| | | | | |
|---|---|---|---|---|
| 8,158,300 B2* | 4/2012 | Markoski | ............. | H01M 8/1011 |
| | | | | 429/400 |
| 8,797,717 B2* | 8/2014 | Feaver | ................... | H01G 11/34 |
| | | | | 361/502 |
| 9,084,546 B2* | 7/2015 | Richardson-Burns | ....................... | |
| | | | | A61B 5/0408 |
| 2007/0123963 A1* | 5/2007 | Krulevitch | ............... | A61N 1/05 |
| | | | | 607/115 |
| 2008/0202251 A1 | 8/2008 | Serban et al. | | |
| 2012/0189534 A1 | 7/2012 | Hussain et al. | | |
| 2014/0045065 A1* | 2/2014 | Bao | ....................... | H01M 4/622 |
| | | | | 429/217 |
| 2016/0025669 A1 | 1/2016 | Sun et al. | | |

OTHER PUBLICATIONS

Largeot et al., "Relation between the Ion Size and Pore Size for an Electric Double-Layer Capacitor," J. Am. Chem. Soc, 2008, 130: 2730-2731.

Nie et al., "Flexible Transparent Iontronic Film for Interfacial Capacitive Pressure Sensing," Advance Materials, 2015, 27: 6055-6062.

Prokop et al., "Polyacrylamide Gel as an Acoustic Coupling Medium for Focused Ultrasound Therapy," Ultrasound in Med. & Biol., 2003, 29: 1351-1358.

Yamazaki et al., "An acidic cellulose-chitin hybrid gel as novel electrolyte for an electric double layer capacitor," Electrochemistry Communications, 2009, 11: 68-70.

* cited by examiner

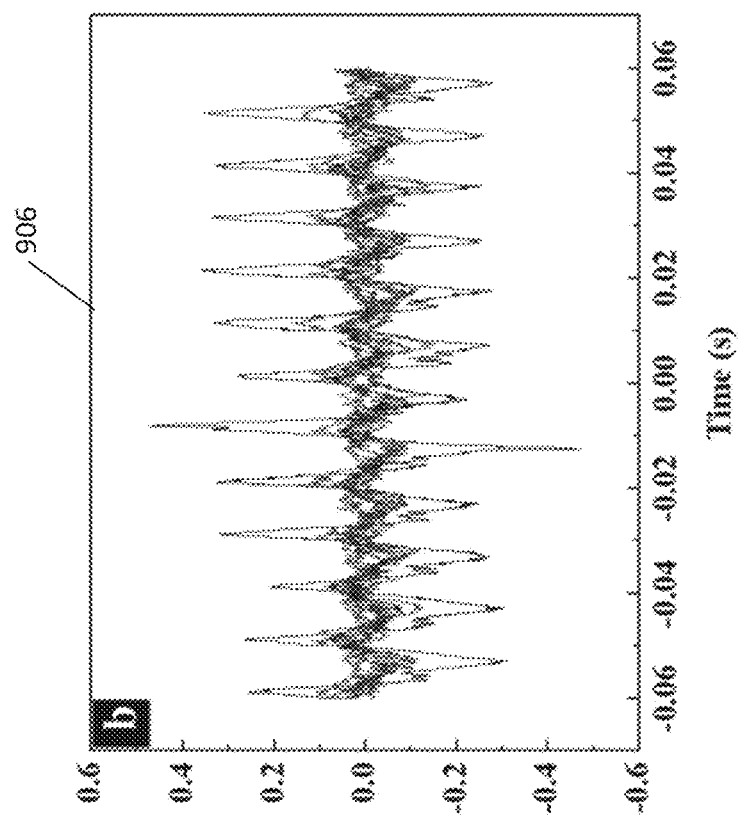
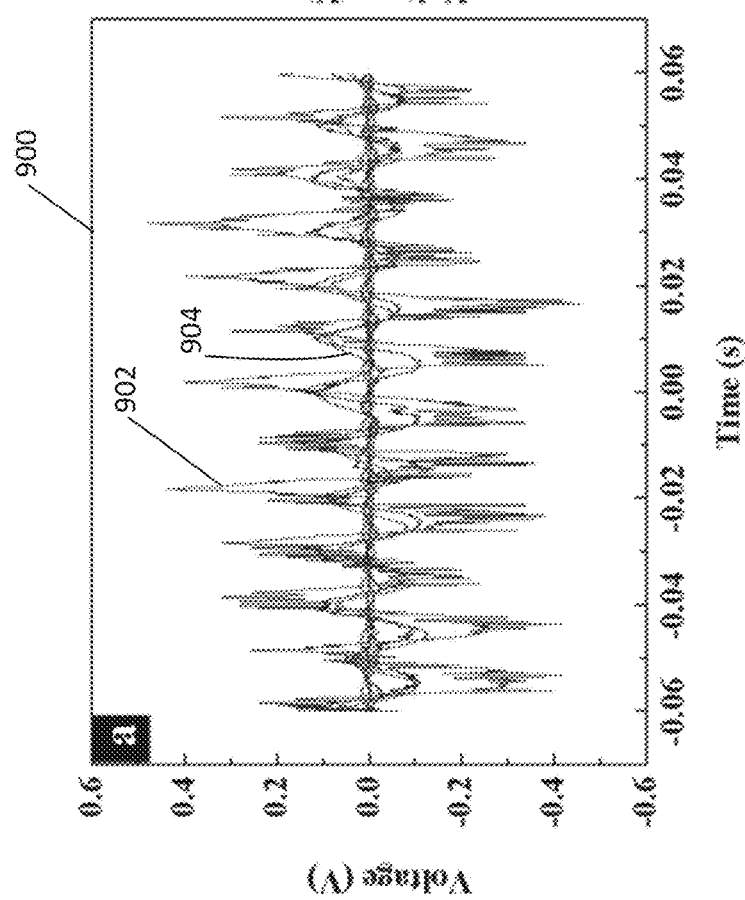
FIG. 9A
FIG. 9B

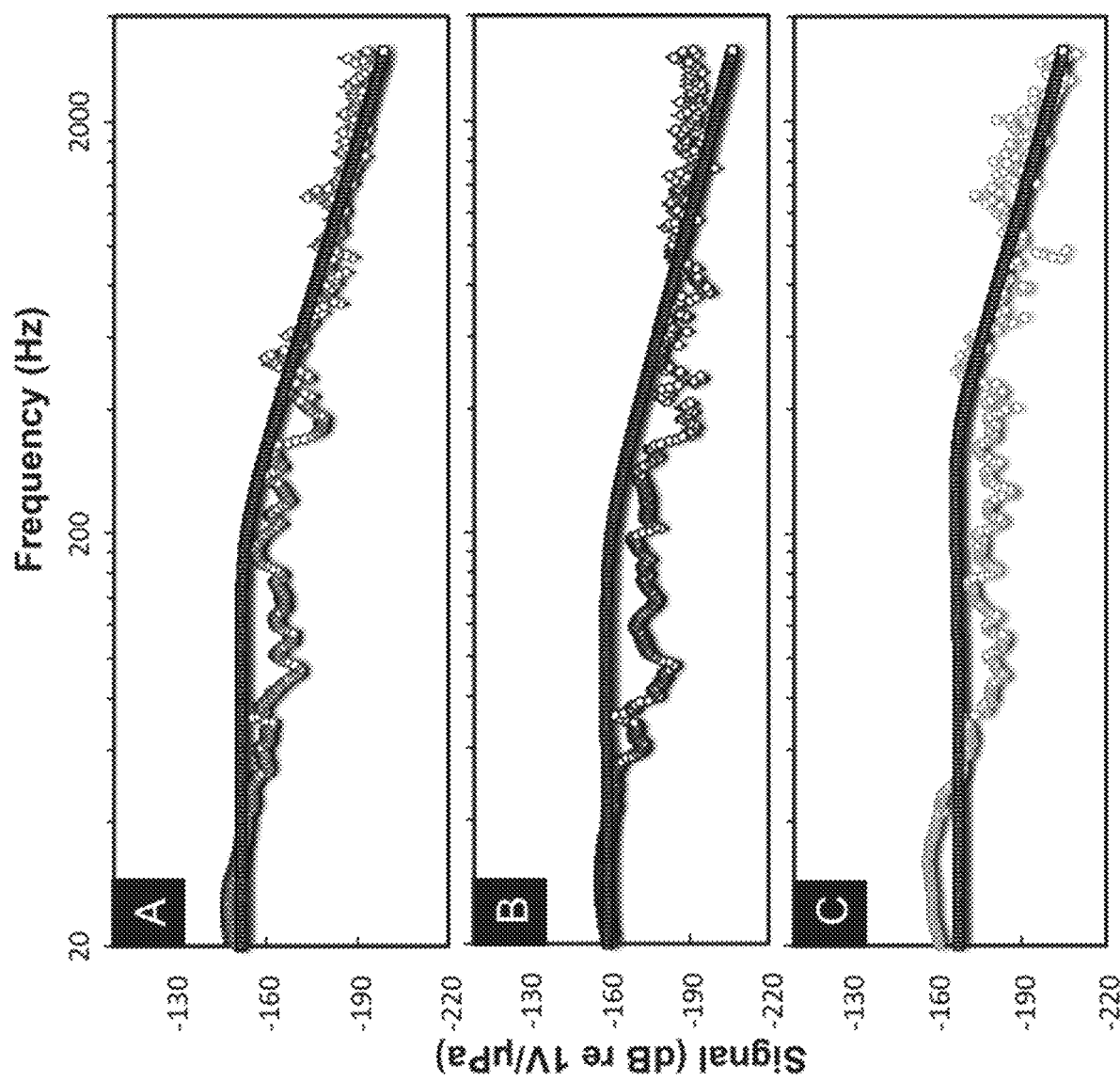

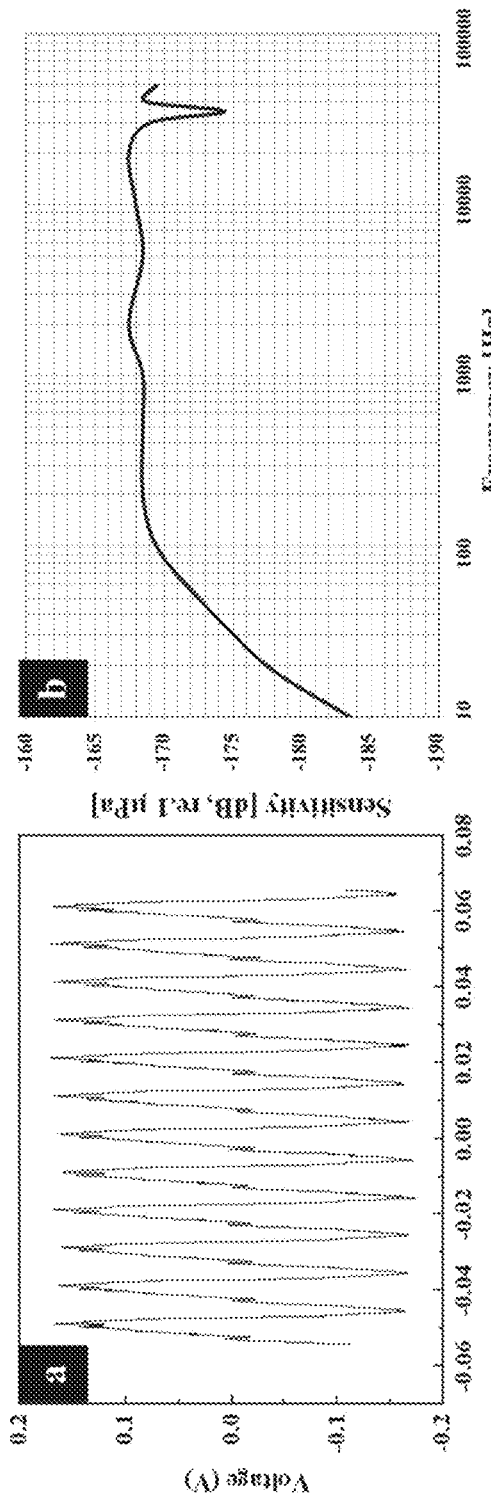
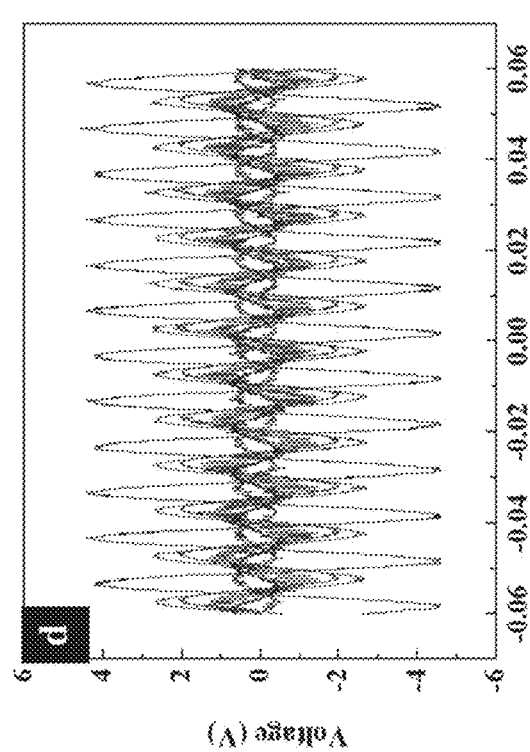
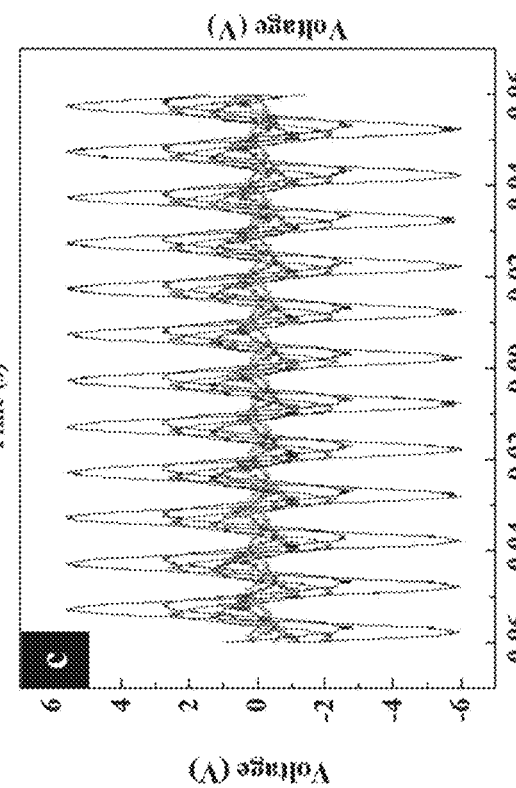
FIG. 11A
FIG. 11B
FIG. 11C
FIG. 11D

HYDROGEL MICROPHONE

CLAIM OF PRIORITY

This application claims priority to U.S. Provisional Application 62/421,941, filed on Nov. 14, 2016, the entire contents of which are incorporated by reference.

STATEMENT OF GOVERNMENT RIGHTS

This invention was made with government support under CMMI1068952 and IIA1338988 awarded by the National Science Foundation. The government has certain rights in the invention.

TECHNICAL FIELD

This specification relates to hydrogel microphones.

BACKGROUND

The oceans cover approximately 71% of the Earth's surface area, with only 5% being explored by human activities. Toward the explorations, numerous underwater vehicles have been developed with a great amount of knowledge learned from fish. To complement vision, fish can adopt a lateral line system to sense pressure variations and to detect water flows and acoustic waves. These skills can help them in mastering swimming behaviors such as rheotaxis, schooling, and prey tracking. Similarly, underwater vehicles, such as submarines, monitor flow velocities and sound waves to navigate, identify hostile objects, track ocean currents and surface waves, and communicate with each other.

However, in the current era of stealthy warfare, piezoelectric-based sound navigation and ranging (SONAR) systems intrinsically hold much larger acoustic impedance against their oceanic background and are determined for a self-exposure during listening. For example, a piezoelectric ceramic such as lead zirconate titanate (PZT) has a density (p) of 7,600 kg/m$^3$ and a bulk modulus (K) close to 100 GPa. In comparison, water has a density of 1,000 kg/m$^3$ and a modulus of 2.0 GPa. The acoustic impedance ($\sqrt{\rho K}$) of PZT can be more than 20 times that of water. In some cases, more than 80% of the sound coming from the object can be reflected. In addition, the detection efficiency of PZT-based acoustic sensors can be relatively poor at low frequencies. Alternatively, suspended thin membranes of poly(vinylidene fluoride) (PVDF) or graphene over air cavities have been proposed as microphones to provide a higher sensitivity than PZT, or to detect ultrasound from bats, but these configurations introduce even larger mismatch in acoustic impedance between the device (air) and water. Such systems greatly dampen the incoming signal. They may also be difficult to conceal.

SUMMARY

In a general aspect, a hydrogel microphone includes a capacitive sensor that includes a hydrogel structure having a first surface and a second surface. The capacitive sensor includes a first electrode at the first surface of the hydrogel structure, the first electrode including a network of conductive nanoparticles extending into the hydrogel structure, and a second electrode at the second surface of the hydrogel structure.

Implementations can include one or more of the following. The hydrogel structure can include a cross-linked and hydrophilic polymer. The first surface and the second surface of the hydrogel structure can define a thickness between 0.1 mm and 5 mm. The first electrode can include a terminal positioned on and extending along the first surface of the hydrogel structure, in which the terminal is electrically coupled to the network of conductive nanoparticles. The terminal can include copper. The network of conductive nanoparticles can extend from the first surface into the hydrogel structure a depth of 2 to 3 micrometers. The network of conductive nanoparticles can extend toward the second electrode away from the first surface. The network of conductive nanoparticles can include a metal ion selected from the group consisting of Ag+, Ni2+, Au+, and Pd+. The second electrode can include a conductive material selected from the group consisting of aluminum, indium tin oxide, and graphene. The capacitive sensor can include a static compressive load sensitivity of at least 0.1 nF/kPa in air or at least 217 nF/kPa in water. The capacitive sensor can have a response magnitude to an acoustic signal between 20 Hz to 60 Hz of at least −150 dB.

In another general aspect, a method of fabricating hydrogel microphone having a capacitive sensor is provided. The method includes placing a hydrogel structure including ionic precursors between a photoconductive substrate and an electrode, and irradiating the photoconductive substrate to induce a network of conductive nanoparticles to form within the hydrogel structure at a growth site in the hydrogel structure proximate the photoconductive substrate, in which the network of conductive nanoparticles extends from the growth site toward the electrode.

Implementations can include one or more of the following features. The method can include introducing the hydrogel structure to the ionic precursors. Introducing the ionic precursors can include soaking the hydrogel structure in a solution of the ionic precursors. The concentration of the ionic precursors in the solution can be between $10^{-2}$ and 1000 mM. The ionic precursors can include a metal ion selected from the group consisting of Ag+, Ni2+, Au+, and Pd+. The photoconductive substrate can include amorphous silicon. Placing the hydrogel structure between the photoconductive substrate and the electrode can include placing the hydrogel structure between a conductive cover on the photoconductive substrate and the electrode such that the conductive cover faces away from the hydrogel structure. Irradiating the photoconductive substrate can include projecting a pattern of radiation toward the photoconductive substrate to control a location of the growth site of the network of conductive nanoparticles. The method can further include introducing the hydrogel structure to a solution of another ionic precursor to form a terminal of a first electrode of the capacitive sensor on a first surface of the hydrogel structure. In some examples, the solution of the other ionic precursor can be introduced after the network of conductive nanoparticles is formed. In some examples, the solution of the other ionic precursor can be introduced before the ionic precursors are introduced. The other ionic precursor can include copper. The method can further include positioning a second electrode on a second surface of the hydrogel structure such that the first electrode and the second electrode form the electrodes of the capacitive sensor. The second electrode can include a conductive material selected from the group consisting of aluminum, indium tin oxide, and graphene. The method can further include introducing the hydrogel structure to a salt solution having a concentration of ions selected based on a target sensitivity of the capacitive sensor to acoustic waves.

Advantages of the foregoing may include, but are not limited to, those described below and herein elsewhere. The sensing device can have an acoustic impedance that more closely matches with water, thus enabling the sensing device to be used for underwater applications. The location of the network of conductive nanoparticles can be easily controlled to enable the sensing device to be customized for a specific application, e.g., to detect a specific range of loads or types of loads. In particular, the sensing device can be used for applications having a need for high sensitivity sensors, e.g., for detection of airflow, touch, and underwater acoustic waves. Furthermore, the sensing device can be more sensitive to loads without the need for additional signal amplification.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIG. 9A shows a graph of voltage response of a sensing device to sound pressures of various intensities at an ion concentration of $10^{-2}$ mM.

FIG. 9B shows a graph of voltage response of a sensing device to sound pressures of various intensities at an ion concentration of 100 mM.

FIGS. 10A-10C show graphs of a computational model fitted to data of the sensing devices shown in FIG. 8D.

FIG. 11A shows a graph of voltage response of a hydrophone to a selected reference acoustic wave.

FIG. 11B shows a graph of sensitivity to various frequencies between 10 Hz and 60 kHz for a hydrophone.

FIG. 11C shows a graph of voltage response to various acoustic waves for a sensing device in a solution having an ion concentration of $10^{-2}$ mM.

FIG. 11D shows a graph of voltage response to various acoustic waves for a sensing device in a solution having an ion concentration of 100 mM.

Like reference numbers and designations in the various drawings indicate like elements.

DETAILED DESCRIPTION

Deformable networks of conductive particles, e.g., nanoparticles, e.g., metal nanoparticles, in a hydrogel structure can form an electrode for a capacitive sensor to detect physical loads, e.g., airflow, touch, and underwater acoustic waves. These networks, which can be fibril and fractal superstructures, can be formed through an electrochemical reduction of dispersed ions, e.g., silver ions, inside a matrix of hydrogel material. These networks remain beneath a surface of the hydrogel structure, e.g., within the hydrogel structure.

In response to an external load, the networks of conductive nanoparticles deform to change an effective area of the electrode. The networks of conductive nanoparticles further form electrical double layers (EDLs) in which ions contained in a solution within which the hydrogel structure is positioned form layers within gaps between branches of the networks of conductive nanoparticles. A concentration of ions between branches of the networks of conductive nanoparticles can vary with deformation of the hydrogel structure and the networks of conductive nanoparticles. As a result, the concentration of ions within the solution and an applied direct current (DC) bias through the hydrogel structure can be varied to adjust the responsiveness of the capacitive sensor.

Figure 1:
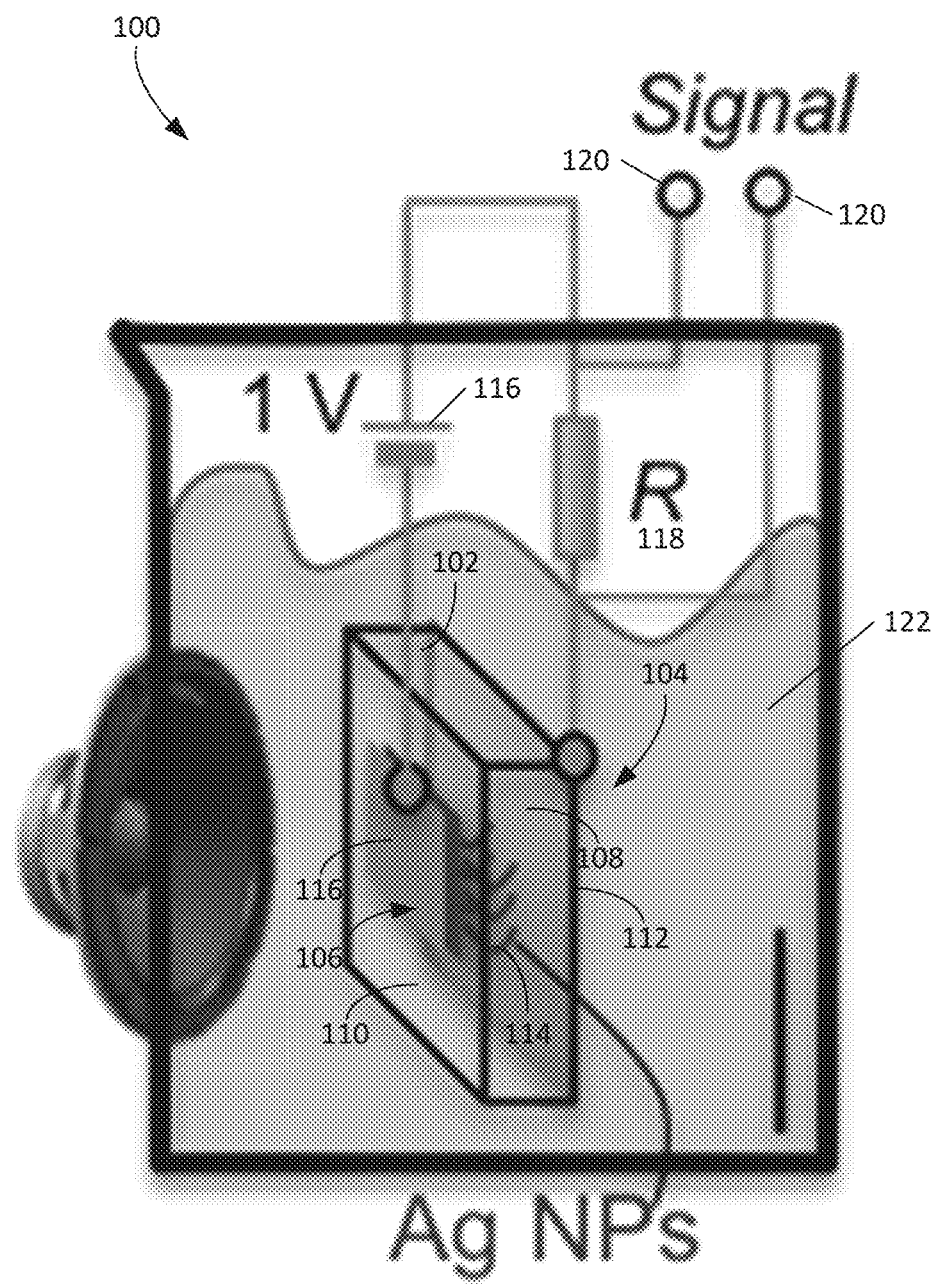
FIG. 1 is a schematic illustration of a sensing device.

FIG. 1 depicts an example of a sensing device 100 that includes sensing capabilities as described above and herein elsewhere. The sensing device 100 includes a hydrogel structure 102 having a first surface 110 and a second surface 112. The first and second surfaces 110, 112 correspond to macro-scale exterior surfaces of the hydrogel structure 102. In this example, the hydrogel structure 102 has an overall shape that is flexible and may deform when a pressure is applied to the surface of the hydrogel structure 102. For example, the sensing device 100 can be placed in an aqueous solution 122 (or another type of solution) and detect underwater acoustic waves.

The device 100 includes a capacitive sensor 104 that includes a first electrode 106 and a second electrode 108. The capacitive sensor 104 has a capacitance defined across the first electrode 106 and the second electrode 108. In some cases, the capacitive sensor 104 includes the hydrogel structure 102, which serves as a dielectric material of the capacitive sensor 104. The first electrode 106 is positioned at the first surface 110 of the hydrogel structure 102, and the second electrode 108 is positioned at the second surface 112 of the hydrogel structure 102. The first electrode 106 includes a network 114 of conductive nanoparticles extending into the hydrogel structure 102. At least a portion of the first electrode 106 extends into the hydrogel structure 102, e.g., toward the second electrode 108. The first electrode 106 is, for example, a porous electrode that includes conductive portions, e.g., the network 114 of conductive nanoparticles entrained in the hydrogel structure.

In some implementations, the conductive nanoparticles are metal nanoparticles (MNP), including metal ions such as $Ag^+$, $Ni^{2+}$, $Au^+$, and/or $Pd^+$. The conductive nanoparticles bond to one another in a manner to form the network 114 of conductive nanoparticles. In particular, using the fabrication processes described herein, ionic precursors can be reduced into the conductive nanoparticles to form the network 114 of conductive nanoparticles. The second electrode 108 includes a conductive material, such as aluminum, indium tin oxide, graphene, etc. In some cases, the first electrode 106 is an anode, and the second electrode 108 is a cathode. Alternatively, the first electrode 106 is a cathode, and the second electrode 108 is an anode.

The capacitance of the capacitive sensor 104 depends on a distance between the first electrode 106 and the second electrode 108, a permittivity of the hydrogel structure 102 between the first electrode 106 and the second electrode 108, and a double layer capacitance that forms at a boundary between the network 114 of conductive nanoparticles and the hydrogel structure 102. The capacitance of the capacitive sensor 104 varies when the hydrogel structure 102 and the network 114 of conductive nanoparticles deform in response to a physical load. A change in the capacitance of the capacitive sensor 104 serves as an indicator of an amount of load applied to the capacitive sensor 104. The capacitance of the capacitive sensor 104 is sensed to determine the amount of load applied to the capacitive sensor 104. In some implementations, the capacitance is an indication of a concentration of ions contained in a solution within which the capacitive sensor 104 is immersed. In some examples, a change in the capacitance is an indicator of a change in the concentration of ions.

The hydrogel structure 102 is, for example, a soft, deformable membrane formed of a hydrogel material. In some examples, the first surface 110 and the second surface 112 of the hydrogel structure 102 define a thickness of the hydrogel structure. The thickness of the hydrogel structure 102 is, for example, between 0.1 mm and 5 mm. The hydrogel structure 102 includes, for example, a hydrogel material, e.g., a cross-linked and hydrophilic polymer capable of absorbing a large volume of water, e.g., capable of absorbing a volume of water greater than 1 times, 10 times, 20 times, 30 times its own volume. In some cases, the hydrogel structure 102 has a water content greater than 50%, 60%, 70%, 80%, or 90% by volume. The hydrogel material is, for example, a cross-linked and hydrophilic polymer, such as poly-acrylamide. In some examples, the hydrogel material includes a polymer having polar functional groups extending from the polymer backbone or on side chains that enable the hydrogels to absorb a large amount of liquid, e.g., water, into the polymer networks without leaking. In some examples, in contrast to a rigid ceramics or a low-density media like air, the hydrogel material has an acoustic impedance similar to the acoustic impedance of water. The hydrogel material has an acoustic impedance of, for example, between 1 and 3 $Pa/m\text{-}s \times 10^6$.

In some examples, the first electrode 106 includes a terminal 116 positioned on and extending along the first surface 110 of the hydrogel structure 102. The terminal 116 is formed of an electrically conductive material, such as copper or nickel. The terminal 116 is positioned along the first surface 110 such that the terminal 116 and the network 114 of conductive nanoparticles form an electrode of the capacitive sensor 104, e.g., the first electrode 106. The terminal 116 is connected to the network of conductive nanoparticles 114.

In some implementations, a resistor 118 is connected in series with the capacitive sensor 104, and output nodes 120 are connected to two terminals of the resistor 118. When the capacitance of the capacitive sensor 104 changes in response to a pressure exerted on the hydrogel structure, the voltage across the capacitive sensor 104 and the voltage across the resistor 118 will change. Thus, the voltage signal at the output nodes 120 is a detection signal that represents an acoustic signal (pressure variations in the water) detected by the capacitive sensor 104.

Figure 2:
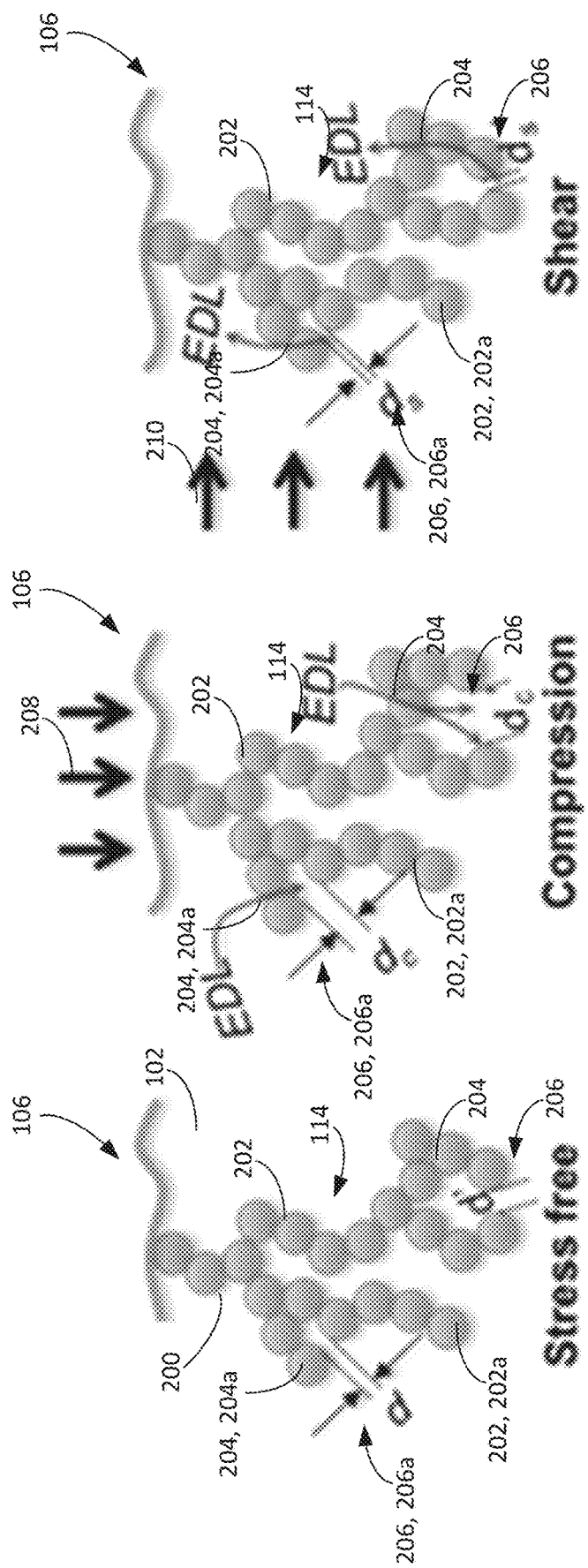
FIGS. 2A-2C are illustrations of a network of conductive nanoparticles.

Referring to FIGS. 2A-2C, the network 114 of conductive nanoparticles includes multiple connected nanoparticles 200 positioned within the hydrogel structure 102. The network 114 of conductive nanoparticles 200 is, for example, a tree-like or dendritic structure within the hydrogel structure 102. In some cases, the network 114 of conductive nanoparticles 200 include a fractal structure of nanoparticles 200. The network 114 of conductive nanoparticles 200 includes, for example, stems 202 of conductive nanoparticles 200 with multiple branches 204 of conductive nanoparticles 200 extending from each stem 202.

In some examples, the network 114 of conductive nanoparticles 200 extends from the first surface 110 into the hydrogel structure a depth of 2 to 3 micrometers. In some cases, the network 114 of conductive nanoparticles extends from the first surface 110 toward the second surface 112. The network 114 of conductive nanoparticles 200, for example, extends toward the second electrode 108 and away from the first surface 110. In some examples, the overall network 114 may extend at an angle to the first surface 110. In some examples, at least a portion of the network 114, e.g., the branches 204 and/or the stems 202, extend through the hydrogel structure 102 at an angle to the first surface 110. In some examples, different branches 204 and stems 202 may extend in different directions.

The tree-like or dendritic configuration of the network 114 of conductive nanoparticles 200 enables double layer capacitance to form between branches 204 of the network 114 of conductive nanoparticles 200. The network 114 of conductive nanoparticles 200 has non-uniform spacing between its nanoparticles 200. For example, for a particular branch 204a, the nanoparticles at the end of the branch 204a are spaced farther away from the stem 202a from which the branch 204a extends than portions of the branch 204a closer to the joint between the stem 202a and the branch 204a.

In some examples, gaps in the network 114, such as a gap 206 between the branch 204a and the stem 202a, enable formation of EDLs. In particular, when charged ions are introduced to the capacitive sensor 104 and the electrodes 106, 108 are biased with a voltage, e.g., a direct current (DC) voltage, a thin layer of the charged ions are attracted to the electrodes 106, 108 to form the EDL. The bias voltage can be provided by, e.g., a voltage source 116. The double layer capacitance formed at the boundary between the network 114 and the hydrogel structure 102 is defined by a characteristic thickness of the EDL, e.g., a Debye length ($\kappa^{-1}$) of the EDL. The width of the gap 206a between the branch 204a and the stem 202a influences the characteristic thickness of the EDL. The charged ions form a thin layer within, for example, 0.01 to 10 nanometers of the electrodes 106, 108. Due to a small value of the Debye length of the EDL relative to the overall length between the first and second surfaces 110, 112 where portions of the first and second electrodes 106, 108 are positioned, the capacitive sensor 104 has a capacitance that is 1000 to 100,000 times greater than a dielectric capacitor whose capacitance is governed by the distance between its electrodes, e.g., as opposed to EDLs. In one example, a concentration of charged ions is introduced to the capacitive sensor 104, e.g., an aqueous solution containing ions is introduced to the capacitive sensor 104, and the ions build up at the gap 206 to form the EDL.

In some implementations, the area of the first electrode 106 is smaller than the area of the second electrode 108, e.g., 10 to 40 times smaller, such that the capacitance of the capacitive sensor 104 is governed by the capacitance contributed by the EDLs formed at the first electrode 106. The EDL capacitance changes when the network 114 of conductive nanoparticles is deformed. The network 114 of conductive nanoparticles is deformable such that the width of the gap 206 changes in response to deformation of the network 114. The tree-like or dendritic configuration is supported by the soft, deformable hydrogel, which enables the network of conductive nanoparticles 114 to deform in response to a physical load, as each of the branches of the network of conductive nanoparticles 114 is deformable. The physical load can be caused by, for example, a pressure wave, an acoustic wave, a flow of air, a touch, or an underwater wave, etc. The network of conductive nanoparticles 114 is, for example, deformable when a compressive load or a shear load is applied to the capacitive sensor 104. As a result, the capacitance of the capacitive sensor 104 changes in response to a compressive load or a shear load.

The network 114 of conductive nanoparticles is configured such that the deformation of the network 114 leads to a change in concentration of the charged ions at the electrodes 106, 108, and thus, a change in the capacitance of the EDLs. As shown in FIG. 2B, the network 114 of nanoparticles 200 deform when a compressive load 208 is applied at the first surface 110 of the capacitive sensor 104. In particular, the branches 204 and the stems 202 move away from one another such that the gaps 206 between the branches 204 and the stems 202 lengthen. Because the lengths of the gaps 206 increase, more space is available between the branches 204 and the stems 202 to form additional EDLs. The capacitance of the capacitive sensor 104 changes in response to the applied compressive load 208. In particular, the capacitance varies with the magnitude of the applied compressive load 208. Furthermore, in some examples, as shown in FIG. 2C, the network 114 of nanoparticles 200 deform when a shear load 210 is applied to the capacitive sensor 104, e.g., a load parallel to the first surface 110. Due to the shear load 210, the gaps near the joint between the stems 202 and the branches 204 shorten, thereby changing the capacitance of the capacitive sensor 104 accordingly. The capacitance, as a result, varies with the magnitude of the shear load 210 applied to the capacitive sensor 104.

The concentration of ions, e.g., in the solution of ions introduced to the capacitive sensor 104, is selected to define the sensitivity of the capacitance sensor 104. An EDL having a larger characteristic thickness, e.g., corresponding to the EDL formed due to a lower concentration of ions, can only be inserted when there are wide gaps at the far end of the branches 204, whereas an EDL having a smaller characteristic thickness, e.g., corresponding to the EDL formed due to a higher concentration of ions, can be tucked close to the stem-branch joints. The sensitivity of the capacitive sensor 104 (which can be determined by, e.g., the amount of response of the capacitance to deformation), is adjustable by changing the concentration of ions in the solution within which the capacitive sensor 104 is positioned.

The capacitive sensor 104, in some implementations, has a static compressive load sensitivity of 0.1 nF/kPa (in air) or 217 nF/kPa (in water). A response magnitude of the capacitive sensor 104 to an acoustic signal between 20 Hz to 60 Hz is, for example at least −150 dB.

In some implementations, the device 100 is used as a cavity-free microphone that is electrically biased and operated under water to measure a physical load.

Figure 3:
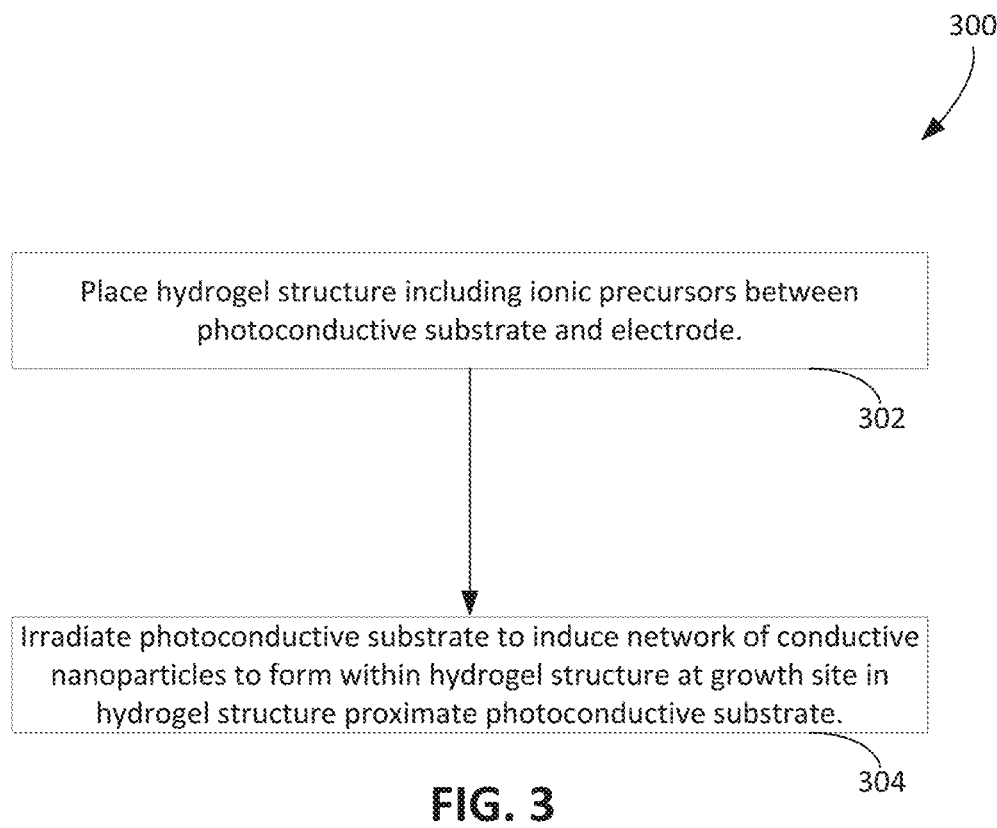
FIG. 3 is a block diagram of a process of fabricating a sensing device.

FIG. 3 is a block diagram of an example process 300 for fabricating the sensing device 100, which can be, e.g., a capacitive sensor. At an operation 302, the hydrogel structure 102 is placed between a photoconductive substrate (e.g., metal covered amorphous silicon substrate) and an electrode. The hydrogel structure 102 includes ionic precursors (e.g., $AgNO_3$). The electrode includes, for example, an indium tin oxide (ITO) layer. At an operation 304, the photoconductive substrate is irradiated to induce a network of conductive nanoparticles to form within the hydrogel structure 102. The network of conductive nanoparticles is formed at a growth site in the hydrogel structure 102 proximate the photoconductive substrate. For example, if the photoconductive substrate is positioned on a surface of the hydrogel structure 102, e.g., the first surface 110, the growth site is at the surface of the hydrogel structure 102. The network of conductive nanoparticles extends from the growth site toward the electrode.

Prior to exposing the photoconductive substrate to the radiation, the network of conductive nanoparticles has not formed within the hydrogel structure 102. Rather, the ionic precursors are present within the hydrogel structure 102 but have not yet formed the network of conductive nanoparticles. The ionic precursors include metal ions, as described herein, that form the network of conductive nanoparticles in the appropriate conditions, e.g., when the photoconductive substrate is irradiated.

In some examples, the process 300 further includes an operation in which the ionic precursors are introduced to the hydrogel structure 102. Alternatively, the hydrogel structure 102 already includes the ionic precursors, e.g., the hydrogel structure 102 contains ionic precursors previously entrained within the hydrogel structure 102. To introduce the ionic precursors, in some cases, the process 300 includes an operation in which the hydrogel structure 102 is soaked in a solution containing the ionic precursors. The hydrogel structure 102 absorbs the ionic precursors, e.g., the ionic precursors diffuse into the hydrogel structure 102, during such an operation. A concentration of the ionic precursors in the solution is, for example, between 0.01 and 1000 mM.

The photoconductive substrate includes, for example, amorphous silicon (a-Si). In some implementations, when the hydrogel structure 102 is placed between the photoconductive substrate and the electrode, the hydrogel structure 102 is placed between a conductive cover on the photoconductive substrate and the electrode. When placed in this manner, the conductive cover, for example, faces away from the hydrogel structure 102. Similarly, the photoconductive substrate faces toward the hydrogel structure 102, e.g., contacts the hydrogel structure 102. The photoconductive substrate, for example, contacts the first surface 110 of the hydrogel structure 102.

In some examples, when the photoconductive substrate is irradiated, a pattern of radiation is projected toward the photoconductive substrate. For example, a light source in combination with a photomask having a mask pattern can be used to produce the pattern of radiation. A location of the growth site of the network of conductive nanoparticles is dependent on the pattern of radiation. In this regard, the pattern of radiation is selectable to control the location of the growth site. In some examples, the pattern of radiation is selectable to control locations of multiple growth sites to form multiple networks of conductive nanoparticles that extend through the hydrogel structure 102.

In some examples, in the process 300, the hydrogel structure 102 is immersed in a plating solution having another ionic precursor to form a terminal that is coupled to the network of conductive nanoparticles. The plating solution may include, e.g., copper ions in order to form a copper terminal. The terminal can be part of the first electrode 106 of the capacitive sensor 104. When the hydrogel structure 102 is immersed in the plating solution, the terminal of the first electrode of the capacitive sensor is formed on a first surface of the hydrogel structure. The terminal and the network of conductive nanoparticles together form the first electrode. In some examples, the solution of the other ionic precursors is introduced into the hydrogel structure 102. The other ionic precursors within the hydrogel structure 102 adsorb atop the surfaces of network of nanoparticles (e.g., silver nanoparticles) before their later reduction into metal (e.g., copper).

Furthermore, in some examples, a second electrode is positioned on a second surface of the hydrogel structure 102. The first electrode and the second electrode form the capacitive sensor, e.g., the capacitive sensor 104. The second electrode is, for example, the second electrode 108 of the capacitive sensor 104, and includes a conductive material.

In some implementations, the process 300 further includes an operation in which the hydrogel structure 102 is introduced to a salt solution having a concentration of ions. The concentration of ions is, for example, between $10^{-3}$ mMol and $10^3$ mMol. The concentration of ions affects the sensitivity of the capacitive sensor 104. In some cases, the salt solution is a solution of NaCl, NaOH, $Na_2SO_4$, $CuSO_4$, plus additives to stabilize the solution under the external bias.

EXAMPLES

Implementations of the hydrogel microphones are further described in the following non-limiting examples.

Example 1: Method of Fabricating Sensing Devices

The following example is directed to a method of fabricating a sensor in accordance to the technology described herein. In this example, a porous and deformable electrode was formed within a hydrogel structure to form the sensor. A size of the pores was adjusted to adjust the coverage of the EDL. The electrode included a network of MNP.

Figure 4A:
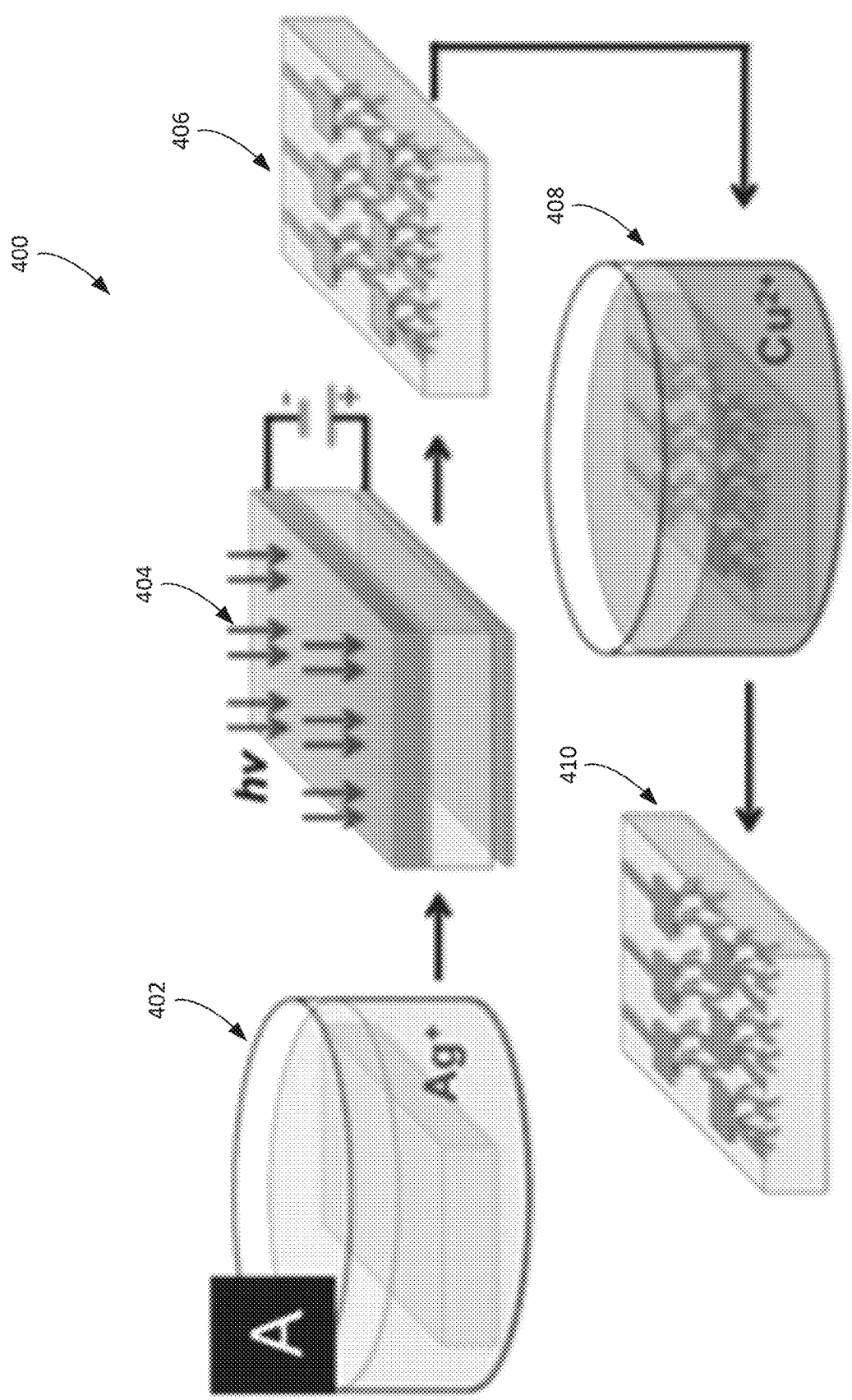
FIG. 4A illustrates a process of fabricating a sensing device.

The electrode was formulated in accordance to the process 300 described with respect to FIG. 3. In this specific example, referring to a process 400 depicted in FIG. 4A, in step 402, a piece of hydrogel, e.g., including a hydrogel structure, was first soaked inside a dilute solution of silver nitrate ($AgNO_3$). In this regard, silver, e.g., $Ag^+$, was selected as the source of metal ions, e.g., that served as ionic precursors for forming the network of conductive nanoparticles (NPs) as described. While the hydrogel structure was soaked within the dilute solution of silver nitrate, in some cases, the hydrogel structure is preloaded with silver ions.

To form the hydrogel structure, 10 mL aqueous solution of acrylamide (AAm, monomer; 3.0 M, 2.133 g), methylene bisacrylamide (MBAA, crosslinker; 10.0 mol %, 0.456 g), ammonium persulfate (AP, initiator; 0.05 mol %, 0.003 g), and $AgNO_3$ (30.0 mM, 0.051 g) were mixed in a 50 mL plastic beaker. The solution was pipetted to fill a small volume between two parallel glass sheets that were separated by a silicone spacer of 1.0 mm in thickness. The polyacrylamide (PAAm) hydrogel structure loaded with the silver ions was peeled from the substrate and cut into desired shape and size after one hour of gelation at room temperature.

In step 404, the hydrogel structure was wiped clean and placed between a metal covered a-Si substrate (3.4×2.3 cm$^2$; Solar-powered Polyresin Rock Garden Lights; Greenbrier International Inc.) and a glass slide coated with ITO. The PAAm membrane loaded with silver ions was placed on top of the amorphous silicon substrate. The a-Si substrate was previously soaked in a dilute solution of hydrochloride (HCl, 2.0 M, 50 mL) to etch away the aluminum cover and later rinsed with copious DI water (100 mL). The a-Si substrate was used to control the locations of growth sites for the network of silver nanoparticles to be formed within the hydrogel structure.

Figure 4C:
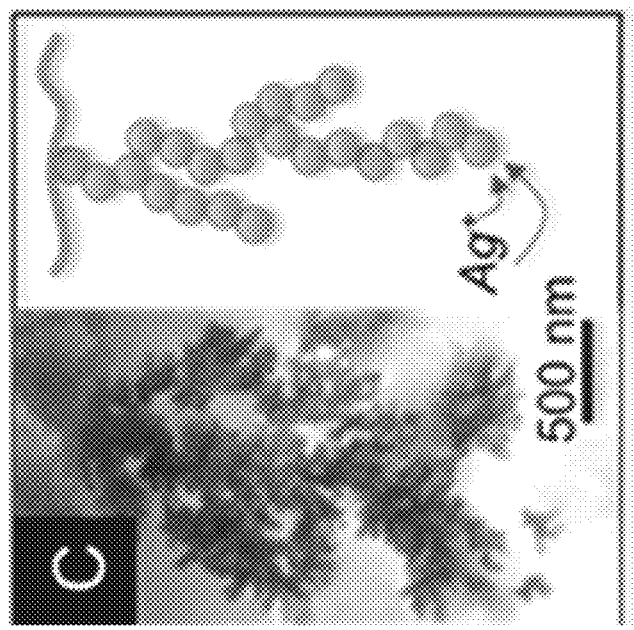
FIG. 4C illustrates, on the left, an electrochemical reduction occurring inside of a hydrogel structure and, on the right, a schematic representation of a network of conductive nanoparticles resulting from the electrochemical reduction.
Figure 4B:
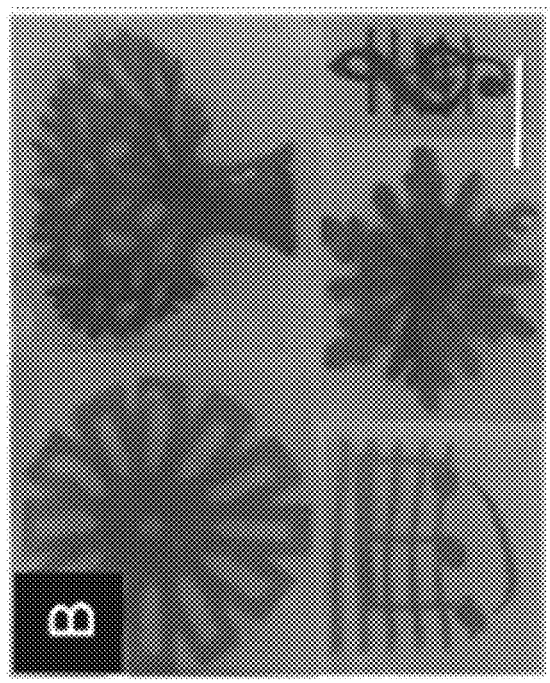
FIG. 4B are photographs of sensing devices.

In step 406, the a-Si substrate was exposed to a projected light from an optical microscope (Meiji, Japan). The assembly was electrically biased under a voltage of 3.0 V for 5 seconds such that the ITO-coated glass slide functioned as an anode and the a-Si substrate functioned as a cathode. Light was projected through the a-Si substrate, and exposed areas of the insulating a-Si substrate became photoconducting. The photoconduction from the a-Si substrate triggered the formation of a dark colored network of silver nanoparticles inside the hydrogel structure. The photoconduction of the a-Si substrate gave rise to a circuit to form between the a-Si substrate and the ITO-coated slide, thereby reducing the silver ions within the hydrogen membrane into silver nanoparticles. The photosensitive a-Si substrate was used as the cathode, allowing digital exposure as an efficient way to control the growth sites for the MNP. Since small patterns were generated using a digital projector connected with an optical microscope, the pattern shape and size (7.6 µm resolution) can be easily modified. In particular, the pattern shape and size can be modified in a way to control the locations of growth sites in situ and to regulate MNP concentration at different locations. As shown in FIG. 4B, the growth sites were controlled to form distinct patterns within the hydrogel structure.

In step 408, the assembly including the hydrogel structure and the network of silver nanoparticles was rinsed with deionized water to remove residue of silver salts. The hydrogel structure was then placed inside an aqueous bath of copper sulfate ($CuSO_4 \cdot 5H_2O$) for electroless plating to enable the assembly to function as a capacitor. MNP-hydrogel was immersed in DI water for 48 hours to remove excess silver ions within the hydrogel structure, e.g., to remove silver ions that were not reduced to silver nanoparticles. The DI water was replaced every 12 hours. The ion-free assembly was then transferred to a plating solution (10 mL) including $CuSO_4 \cdot 5H_2O$ (80 mM, 0.18 g), ethylenediaminetetraacetic acid (EDTA, 165 mM, 0.48 g), $K_4[Fe(CN)_6]$ (150 μM, 0.6 mg), NaOH (adjust pH to 12.8, 0.04 g) and formaldehyde (HCHO, 300 mM, 225 μL). The assembly remained within the plating solution for 60 minutes at room temperature. Once a smooth layer of copper coated a surface of the hydrogel structure, the assembly was rinsed with DI water and kept wet until a later use.

During step 408, the silver ions were trapped inside the body of the hydrogel structure. The conversion of the silver ions into solid metal caused formation of a point contact or dendrite-like growth pathway, e.g., thereby forming the network of silver nanoparticles, as shown in FIG. 4C. From the image of FIG. 4C, it can be seen that the silver nanoparticles have dimensions less than 100 nm. The pattern of the silver growth can be considered to be a consequence of the structural defects inside the hydrogel structure. The hydrogel structure is, for example, a polymer network with water-rich gaps. Inside each polymer blob or network, water molecules hydrogen bond within the network frame of the hydrogel structure and are freely associated with silver ions. As the silver reduction process can result in a fast diffusion of metal ions, during step 408, the fractal network of MNP may have formed inside the water-rich gaps within the hydrogel structure. In this regard, not all the nanoparticles were positioned next to the top a-Si surface, but rather, were positioned through the hydrogel structure in portions away from the a-Si substrate. After initial silver ions next to the a-Si substrate were reduced, further reduction continued such that newly formed nanoparticles formed extended electrodes having a dendritic or fractal shape.

The network of silver nanoparticles in step 406 was formed along vertical directions, e.g., extending from the a-Si substrate through the hydrogel membrane toward the ITO-coated slide. The copper plating formed as a result of step 408 enabled electrical access to the MNP formed within the hydrogel membrane. As silver nanoparticles are highly catalytic toward copper reduction, electrodes of copper were selectively deposited on surfaces having silver nanoparticles only. Once the hydrogel surface was wiped clean, it was then paired up with a new ITO electrode to form a capacitor. The assembly thereby formed a load sensor, e.g., a dynamic and/or static load sensor.

Because the MNP growth inside the hydrogel matrix occurred at the cathode side (reduction of metal ions), any metals or even metal supported a-Si could have been used as the electrode. The anode (positive bias) selected was an active metal or metal oxide like aluminum or ITO to achieve a quick implanting (5 sec) under a relatively high bias (3.0 V). Sacrifice of these solids into metal ions prevented water electrolysis or decomposition inside the hydrogel matrix. As a result, no oxygen bubbles that could penetrate or tear the entire gel membrane were produced.

The electroless plating described with respect to step 408 deposited a smooth and robust layer of copper over the areas that have silver nanoparticles, creating an easy and reliable electrical access to the MNP network. In some cases, copper growth could also start from the inside of the hydrogel membrane. For example, copper ions from sulfate bath could diffuse into the hydrogel first, then adsorb atop the surfaces of embedded Ag NPs before their later reduction into a copper metal.

While performing the electroless plating quickly could limit the amount of copper ions diffused into the hydrogel body, a kinetically fast chemical reaction can make the copper electrode grainy and mechanically weak to resist fractures. Increasing the crosslink density of hydrogel can reduce the likelihood of fracture. As diffusion of copper ions in hydrogel is associated with polymer networks due to a van der Waals or even electrostatic effect, a relatively dense polymer membrane can block the copper ions. Increased concentration of monomers (3.0 M) during hydrogel preparation stopped the copper growth into the hydrogel structure.

Example 2: Images of Sensing Device

Figure 5A:
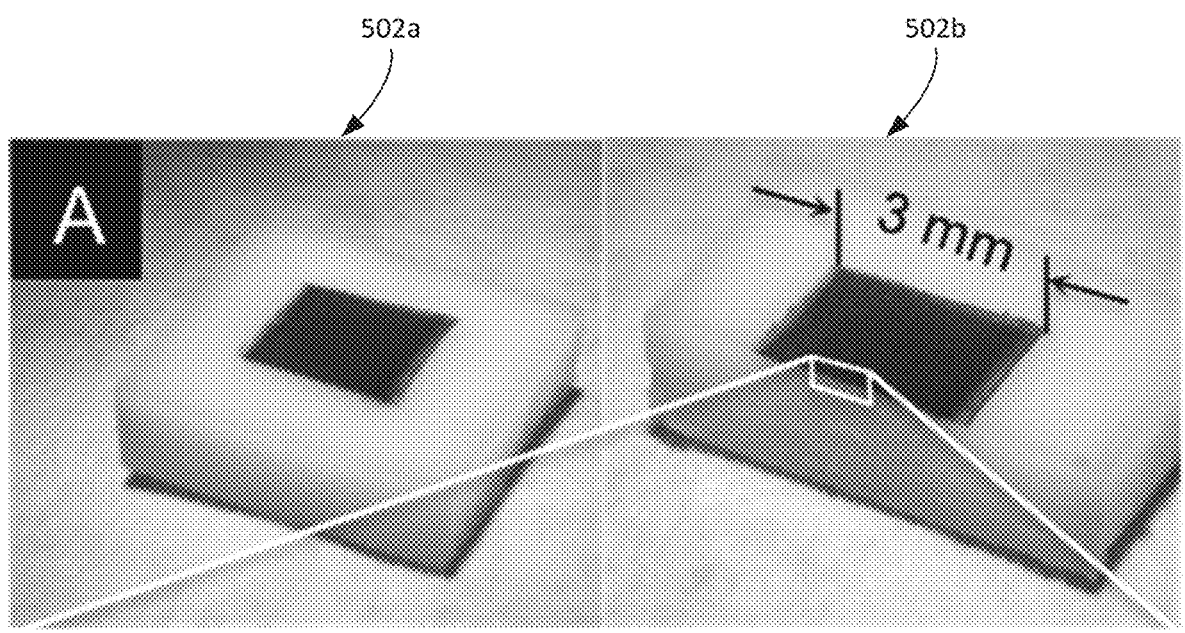
FIG. 5A shows, on the left, an image of a sensing device, and on the right, an image of a cross-section through a portion of the sensing device containing a network of conductive nanoparticles.

A left panel 502a of FIG. 5A shows a photograph of a sensing device fabricated using the methods described with respect to Example 1, and a right panel 502b of FIG. 5A shows a photograph of a sliced portion of the sensing device. The sensing device included a hydrogel structure including a portion, e.g., the darkened portion of the body of the sensing device shown in FIG. 5A, within which a network of MNP is implanted.

The Ag-implanted PAAm hydrogel was also sectioned into ~60 μm thick slices, using Vibratome® 1000 sectioning system to expose the cross-sectional profile. The hydrogel was subsequently loaded into a Samdri® 780A super critical point dryer to remove water from the hydrogel without causing significant structural change to the hydrogel. The dried slice was then glued on a metal plate and examined directly with a Hitachi S-4700 field emission scanning electron microscope under a voltage of 10 to 20 kV.

Figure 5B:
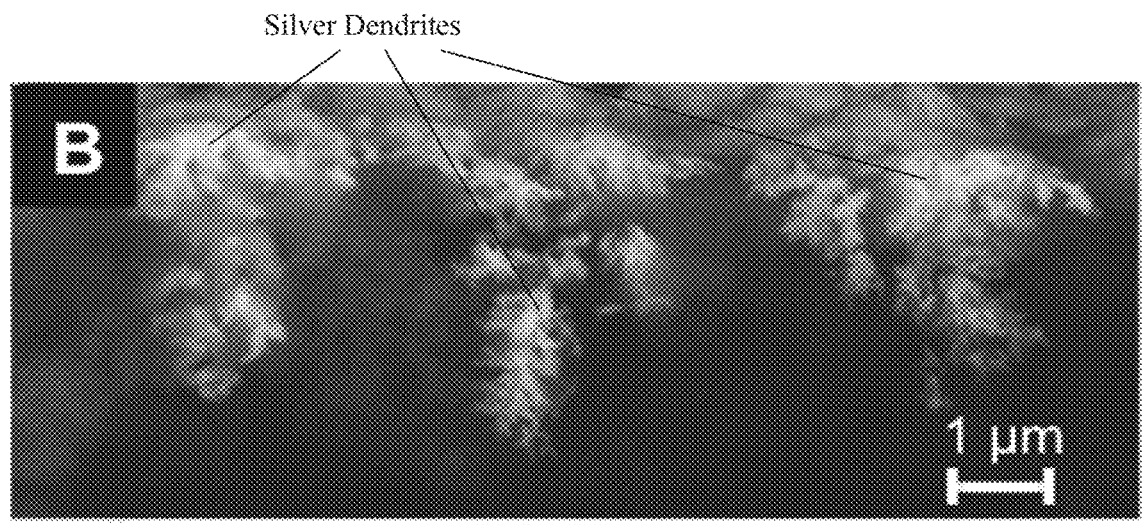
FIG. 5B shows an image of a side view of a network of conductive nanoparticles in a hydrogel structure.

FIG. 5B shows a scanning electron microscopy image of the hydrogel body implanted with a patch (3×3 $mm^2$) of silver dendrites (highlighted yellow in FIG. 5B). The metal nanoparticles had a spiky or dendritic shape composed of sub-100 nanometer particles, with a total height of 2-3 μm measured from a surface of the hydrogel body 104.

Figure 5C:
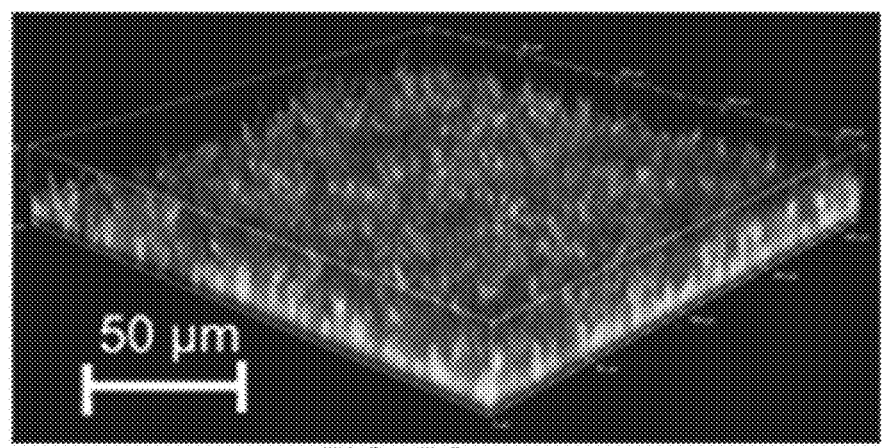
FIG. 5C shows electron microscopy imagery of a network of conductive nanoparticles in a hydrogel structure.

FIG. 5C shows a confocal laser scanning electron microscopy image of the MNP-implanted hydrogel. For confocal microscopy, a bulk piece of Ag-implanted PAAm gel was placed on top of a glass slide, scanned with a 60× water immersion lens and imaged with a Nikon A1 confocal laser scanning microscope system on a Nikon Eclipse 90i using the 561.4 nm excitation laser line (Nikon Instruments Inc., Melville, N.Y.).

Example 3: Response of Sensing Device to Loads

Responses of the sensing device to various loads were measured. A 3 mm×3 mm square of Ag NPs-patch was fabricated in the shallow surface of hydrogel followed by electroless copper plating to study the capacitance change under different salt concentrations and different static loads. The hydrogel membrane (PAAm only or copper coated one) was immersed in a plastic beaker that contained an aqueous solution of NaCl with a concentration of $10^{-2}$, 1, 10, 100, or 1000 mM for 4 hours. Ion concentration inside the hydrogel structure can, in some examples, be much less, dependent on the density and chemical structure of the hydrogel structure. Then the copper coated MNP-hydrogel was wiped dry and wired with an ITO plate (15×15 $mm^2$) for capacitance measurement. In the case of the MNP-free one, a piece of aluminum foil (3×3 $mm^2$) was used as a counter electrode to pair up with the ITO plate for capacitance probing.

Figure 6A:
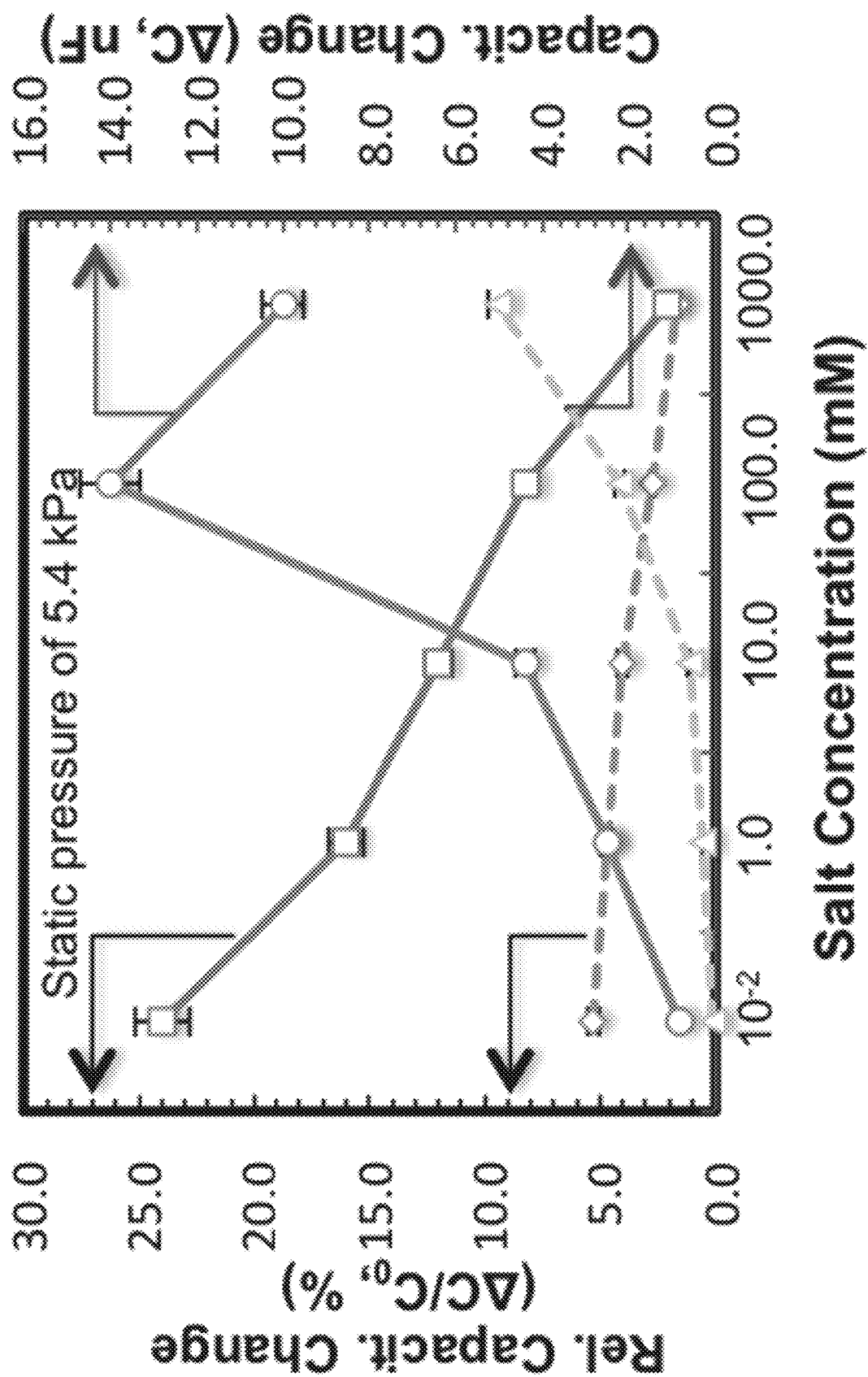
FIG. 6A shows a graph of capacitance changes of sensing devices in response to a static load, with the sensing devices at various salt concentrations.

A weight of 5.0 g (square shape with an area of 9 $mm^2$) was placed on top of the hydrogel device (with MNP or without), with a pressure calculated as 5.4 kPa, to determine the capacitance change in the device under various salt concentrations, the results of which are shown in FIG. 6A.

Figure 6B:
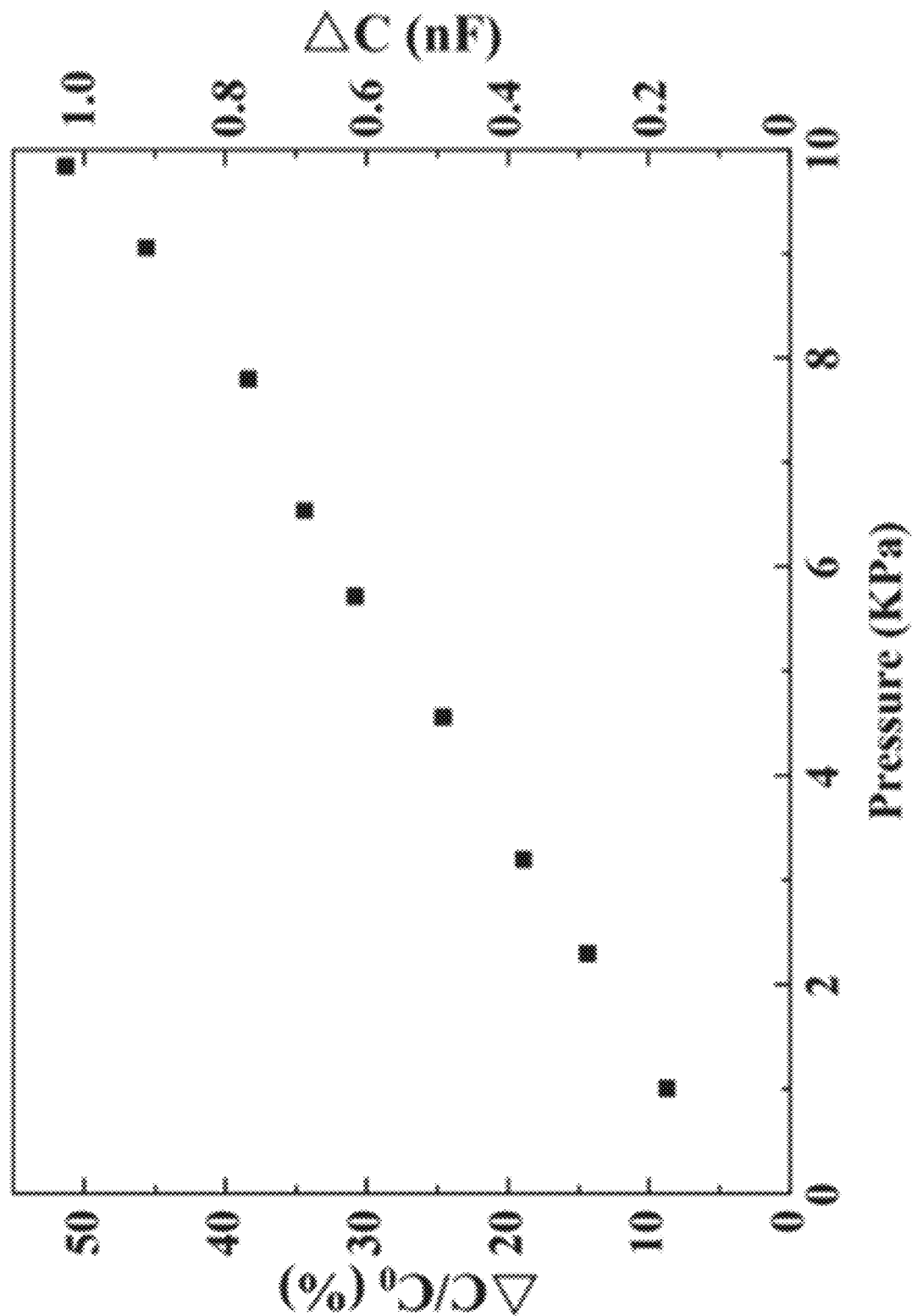
FIG. 6B shows a graph of absolute and relative sensitivity of a sensing device, in particular, capacitance change of the sensing device in response to various static loads.
Figure 6C:
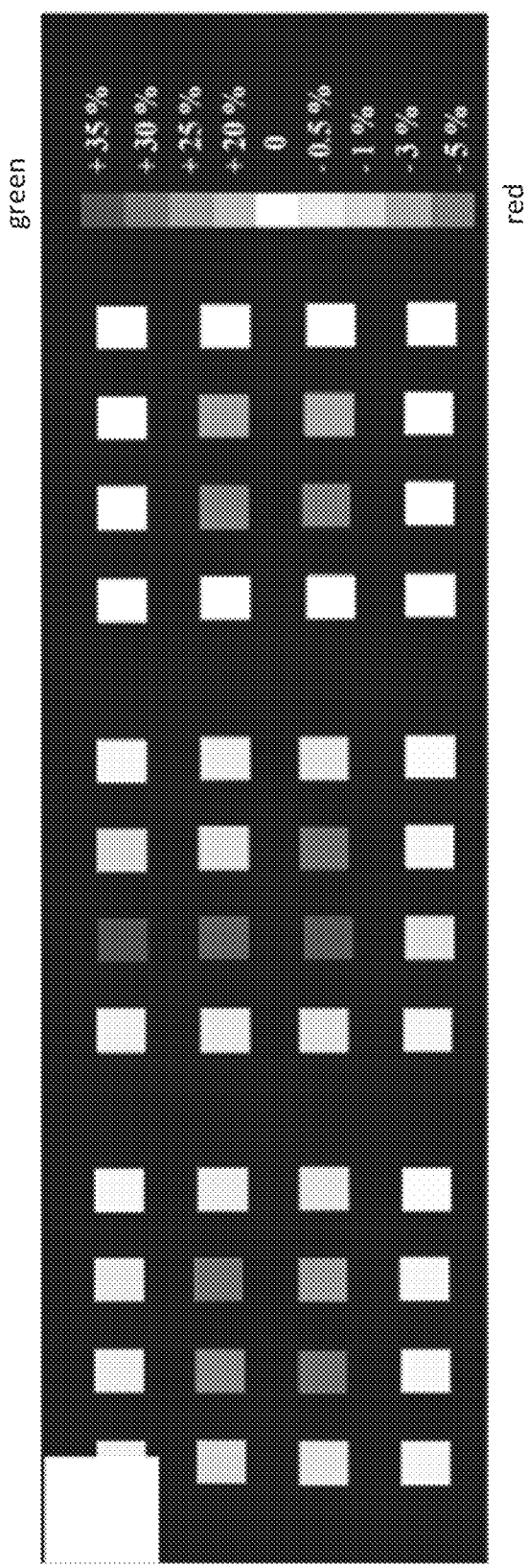
FIG. 6C illustrates capacitance changes in response to a static load on an array of capacitance sensors including networks of conductive nanoparticles.
Figure 6D:
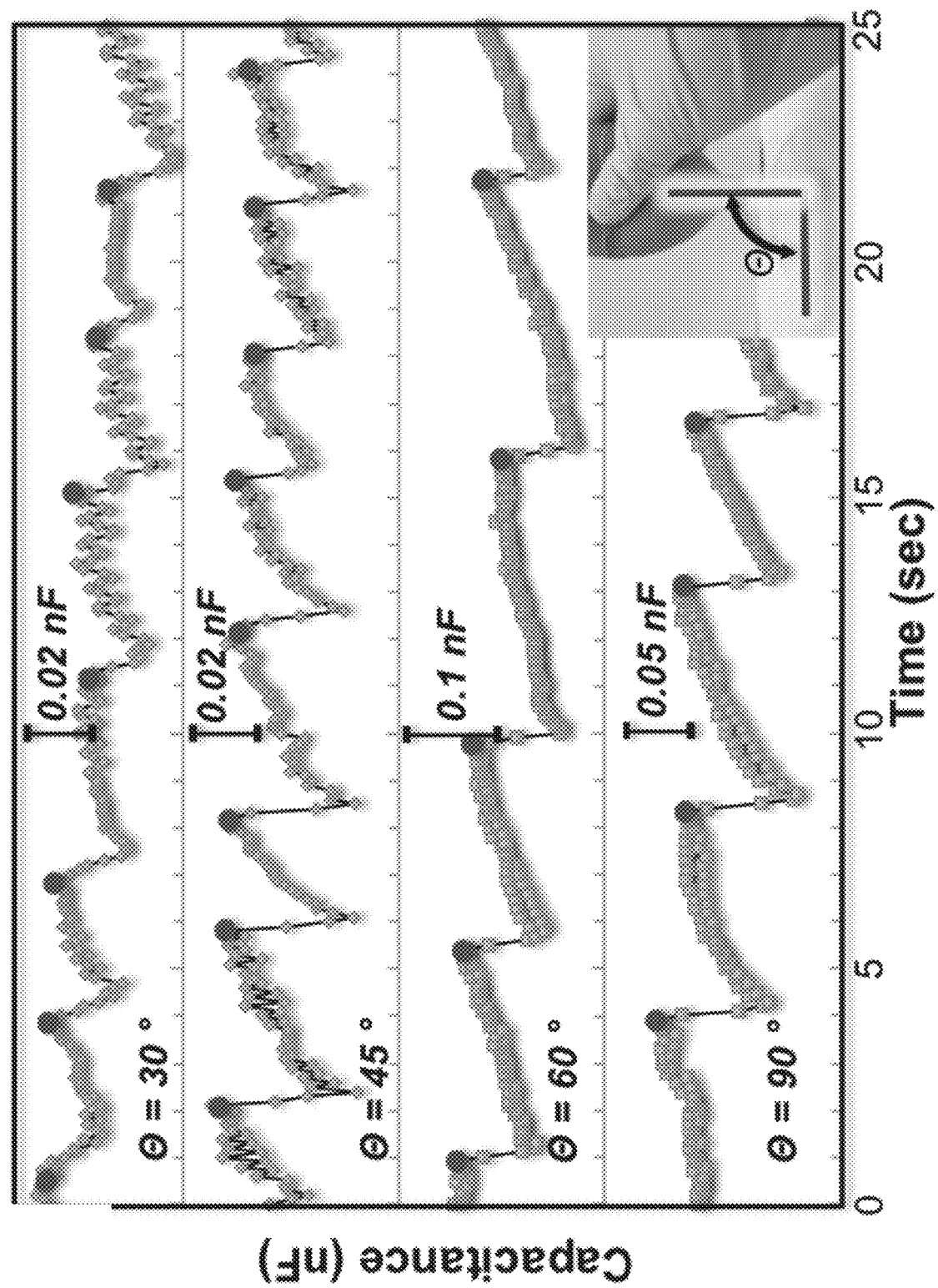
FIG. 6D shows graphs of capacitance varying in response to a periodic load applied to a sensing device at different angles.

To study the static load sensitivity, a series of weights ranging from 0.9 to 9.0 g were used, with pressures calculated from 1.0 to 10.0 kPa. The results of this study are shown in FIG. 6B. For pressure mapping, the results of which are shown in FIG. 6C, a static load was applied by placing a weight of 66, 59, or 3.0 g on top of the copper coated MNP-hydrogel (device size of 81 ("O" shape), 72 ("L" shape), and 4 $mm^2$ (small dot)), corresponding to a pressure of 8.0 kPa. For detection of air movement, a piece of copper coated MNP-hydrogel with 3 mm×3 mm area of Ag NPs was used as the sensing device (ITO as another electrode). The airflow was generated by gently squeezing a rubber blower fixed on a ring stand; the angle of blowing was adjusted to ensure the tip of the blower always pointed to the center of the Cu electrode. The distance between the tip of rubber blower and the surface of the hydrogel was fixed at 10 mm, and the pressure generated by gripping was controlled at 1.0 kPa. The results of this study are shown in FIG. 6D A response of the capacitance of the hydrogel device to a static load 5.4 kPa was investigated. All the capacitances were measured by using Hewlett Packard (4263B) LCR meter at a frequency of 1 kHz and a voltage of 20 mV, and experimental data was exported to a LabVIEW program. TABLE 1 shows the contribution of ion concentration modulation ($\Delta n_\infty/n_\infty$) and deformable MNP ($\Delta A/A$) in the hydrogel capacitors toward capacitance and variations in the capacitance under a static pressure of 5.4 kPa. In FIG. 6A, as shown by the data in dashed lines, under pressure even the control sample (MNP-free hydrogel) showed an appreciable capacitance change ($\Delta C \sim 0.05$ to 5.0 nF) or a non-trivial relative capacitance change ($\Delta C/C_0 \sim 5.3\%$ to 1.6%). The MNP-hydrogel (solid lines) response to a static pressure of 5.4 kPa was more than four times the response of the MNP-free device (dashed lines) in relative capacitance change, and more than 7-8 times the response of the MNP-free device in absolute capacitance change.

$C_0$ is the initial capacitance, p the static pressure applied, and $\Delta C$ the capacitance change. Calculated RS and AS in FIG. 6B were 0.048 $kPa^{-1}$ and 0.1 nF/kPa, respectively.

A relationship between relative capacitance change and ion concentration change was established in TABLE 1. Under compression, the MNP-free hydrogel experienced a moderate concentration fluctuation ($\Delta n_\infty = 10.9\%$ to 3.2%) at the electrolyte-electrode interface. These changes respectively contributed to a shortened EDL thickness and a large perturbation (5.3%) in capacitance for devices having less salt ($10^{-2}$ mM) or a small perturbation (1.6%) to those having more salt (1000 mM). Even though the latter perturbation was small, a large initial capacitance (312.5 nF) in a stress-free device yet manifested into a nontrivial increase of 5.0 nF, as shown in FIG. 6A.

The implantation of MNP presented an effective way to tune the total capacitance in addition to the ion concentration modulation ($\Delta n_\infty$) described above. The distortion of fractal network of MNP directly changed the effective electrode area ($\Delta A$). Indeed, under the same pressure, approximately 3-4 times of additional response in capacitance change ($\Delta C/C_0 \sim 24.0\%$ to 8.2%) or 7-8 times of response in capacitance change ($\Delta C \sim 0.83$ to 14.0 nF) (solid lines, FIG. 6A) were observed. Since $\Delta C$ is dependent on both $\Delta n_\infty$ and $\Delta A$, assuming ion concentration varies the same amount under the same pressure (i.e. $\Delta n_\infty$ is the same at different pressures), $\Delta A$ could be extracted.

This example shows a large capacitance value (nF) and a wide tunable window (0.94 to 312.5 nF, as shown in TABLE 1) that is highly dependent on salt concentrations ($10^{-2}$ to 1000 mM) are possible. Unlike those dielectric counterparts where the capacitance (pF) was dominated by thin film or device thicknesses, in this example, thin EDL thickness or short Debye length along the electrode/hydrogel interface gave rise to a large capacitance in hydrogel device. As the EDL thickness was also inversely proportional to the square root of salt concentrations, the hydrogel capacitor delivered

TABLE 1

| Salt concentration (mM) | MNP-free hydrogel | | | | MNP-hydrogel | | | |
|---|---|---|---|---|---|---|---|---|
| | $C_0$ (nF) | $\Delta C$ (nF) | $\Delta C/C_0$ | $\Delta n_\infty/n_\infty$ | $C_0$ (nF) | $\Delta C$ (nF) | $\Delta C/C_0$ | $\Delta A/A$ |
| $10^{-2}$ | 0.94 | 0.05 | 5.3% | 10.9% | 3.45 | 0.83 | 24.0% | 17.7% |
| 1 | 6.38 | 0.3 | 4.7% | 9.6% | 15.625 | 2.5 | 16.0% | 10.8% |
| 10 | 15 | 0.6 | 4.0% | 8.2% | 36.67 | 4.4 | 12.0% | 7.7% |
| 100 | 81.5 | 2.2 | 2.7% | 5.5% | 170.73 | 14 | 8.2% | 5.4% |
| 1000 | 312.5 | 5.0 | 1.6% | 3.2% | 476.2 | 10 | 2.1% | 0.5% |

FIG. 6B shows the relative capacitance change ($\Delta C/C_0$) versus applied pressure for the MNP-hydrogel toward static loads from 1.0 to 8.0 kPa. Relative sensitivity (RS) was defined as $$RS = \frac{\delta\left(\frac{\Delta C}{C0}\right)}{\delta P}.$$

Absolute sensitivity (AS) was defined as $$AS = \frac{\delta(\Delta C)}{\delta P}.$$

more than 300 times increase in capacitance when salt concentration increased from $10^{-2}$ to 1000 mM. In return, this large value of capacitance provided the device a large amount of charges for later stimuli detection, and potentially resulted in a large signal to noise ratio and the ease in operating under a low bias voltage (1 V).

In another experiment described with respect to FIG. 6C, to map the shape of a static load or pressure, a 4×4 sensor array was fabricated in accordance to the example fabrication processes described herein. The sensor array was fabricated first by growing four 3 mm×27 mm stripes of Ag NPs on one side of the PAAm hydrogel membrane and then by growing another four stripes orthogonally on the other side. An electroless copper plating operation was then performed, and each resulting copper stripe was connected with a thin copper wire (12 gauge) through a silver paste (Electron Microscopy Sciences), followed by further coating with epoxy glue (Loctite® Quick Set™ Epoxy) to secure a firm contact for the later capacitance measurement.

The response of the hydrogel device to external loads was plotted in FIG. 6B. The device response was quantified in two ways, one by relative capacitance change ($\Delta C/C_0$; dimensionless) and the other by the absolute capacitance change ($\Delta C$; unit of nF). The relative response agreed with previously published results. The absolute response can be used to determine the magnitude of the measured charge. The slope in FIG. 6B indicates an absolute device sensitivity of 0.1 nF/kPa or a relative sensitivity of 0.048 $kPa^{-1}$. In comparison, a dielectric capacitor coupled with a transistor had an absolute sensitivity of 15.4 pF/kPa (or 8.4 $kPa^{-1}$) and a dielectric device (embedded with Ag nanowires) had an absolute sensitivity of 34.2 pF/kPa (or 3.8 $kPa^{-1}$). The ion-rich device had a greater absolute sensitivity in comparison to other dielectric sensors due to the large EDL capacitance and the deformation of MNP electrode. In addition, the MNP in the hydrogel sensor was electrically biased, and deformation of the MNP could attract or repel additional ions from the neighboring hydrogel matrix. As a result, ion concentrations next to the MNP can be modulated through the combination of deformation and applied bias.

As shown in FIG. 6C, arrays of hydrogel capacitive sensors showed increased capacitance at areas having a direct contact with the external loads. Other portions away from the loads show diminished values, likely due to the shear-induced capacitance decrease. The array of MNP in hydrogel can map out contour of shaped contacts (load of 8.0 kPa), i.e., an "O", an "L", and a small dot. Capacitance increases (green) or decreases (red) were due to location of the loads.

In another experiment described with respect to FIG. 6D, airflow of 50 mL/sec was applied over MNP-hydrogel surfaces from four different angles (30 to 90°) (ca. 1.0 kPa in pressure at $\theta=90°$). Regardless of the air breeze directions, as shown in FIG. 6D, all four devices showed reduced capacitance, with larger reduction for devices under a larger angle of air blowing. The air streamlines conformed to the hydrogel surface and mainly induced shear force. Parallel blow allowed longer distances to develop thicker boundary layers, which largely reduced the velocity gradient near the hydrogel surface and thus the shear force is smaller. Yet, one feature shown in the data depicted in FIG. 6D was the observed long recovery time (ca. 5.0 sec) during the unloading of air breeze, whereas the loading stage was much faster (0.1 sec). Since the external load was applied over the bulk of hydrogel device, with gel as the major piece of the device, the device response followed the viscoelastic behavior of the gel. At the beginning of the loading step, the gel was far away from the new equilibrium state and hence deformed quickly towards it. The loading step was very short, and when the stress was released, the gel was only slightly perturbed from its original equilibrium state, and therefore relaxed slowly towards it. The observed slow recovery time was due to the small equivalent spring constant (Young's modulus) or ultra-soft nature of the hydrogel membrane. As MNP was wrapped inside the hydrogel matrix, how fast the pore could be opened or closed depended on the response of the hydrogel matrix.

Example 4: Analysis of Effective Area of Capacitive Sensors

The following example presents an analysis for determining an effective area of an electrode including a network of metal nanoparticles. In Example 3, the aluminum electrode (foil) may not have formed a conformal contact in the control sample. As a result, an increase in electrode contact area could have caused an increase in capacitance. However, elimination of small air voids may not vary with salt concentrations and usually can be managed to a much less value. A decrease in EDL thickness could have, on the other hand, increased the capacitance. A moderate pressure of 5.4 kPa to directly shorten the distance between the ion-electron pairs may not have been possible. Rather, a local variation in ion or salt concentration along the electrolyte-electrode interface could be feasible. Hydrogels such as polyacrylamide (PAAm) have been known for structural heterogeneity, where polymer networks or blobs of different sizes individually control its ion retention and mobility. Under compression, deformed hydrogel blobs could release trapped ions from the soft network into both surfaces of the two electrodes. Extra ions could then alter the Debye length of EDL, resulting in an increased capacitance. The timescale for such a concentration change could be proportional to ion diffusion constant. As water and sodium chloride were the two major ion providers in the hydrogel device in Example 3, a relocation of proton, sodium, or chloride ions from neighboring polymer blobs may take about 50 msec ($\tau=L^2/2D$, assuming diffusion constant (D) of $10^{-5}$ $cm^2/sec$) to reach the electrodes over a distance of 10 μm (L), suggesting a fast enough response towards a static load.

Analytically, the capacitance of the hydrogel device (Al/hydrogel/ITO) was dominated by the EDL capacitor on the aluminum side, as it is 25 times smaller in area than the ITO plate. This EDL capacitance could be estimated using a simple capacitor model, i.e., $$C_0 = \varepsilon \varepsilon_0 \frac{A}{\kappa^{-1}},$$

where $\varepsilon$ and $\varepsilon_0$ for dielectric permittivity of the hydrogel and vacuum respectively, A as effective area of the electrode, and $\kappa^{-1}$ as the EDL thickness. Since EDL thickness was inversely proportional to the square root of ion concentrations ($n_\infty$), the capacitance change due to ion concentration change ($\Delta n_\infty$) was determined to be $$\Delta C = \varepsilon \varepsilon_0 \frac{A}{\kappa^{-1}} \left( \frac{\kappa^{-1}}{\kappa^{-1'}} - 1 \right) = C_0 \left( \sqrt{1 + \frac{\Delta n_\infty}{n_\infty}} - 1 \right) \approx \frac{1}{2} C_0 \frac{\Delta n_\infty}{n_\infty}.$$

As described above, the MNP-hydrogel capacitor (Cu/Ag MNP/hydrogel/ITO) has ITO as one of the electrodes just like the MNP-free device (Al/hydrogel/ITO), but a different counter electrode design was implemented. The ITO side (15×15 $mm^2$) could be considered to have the EDL capacitance with a value of C. In the control sample (Al/hydrogel/ITO), a pure aluminum foil (3×3 $mm^2$) was the counter electrode. The EDL capacitance was thus estimated to be C/25. A porous electrode of MNP that was m times larger in surface area replaced Al, resulting in a capacitance of mC/25. Capacitance ($C_0$) of the MNP-hydrogel device was determined to be $$C_0 = \frac{C \times \frac{m}{25} C}{C + \frac{m}{25} C} = \left( \frac{m}{1 + \frac{m}{25}} \right) \left( \frac{C}{25} \right).$$

Under pressure, the change in ion concentration ($\Delta n_\infty$) in the hydrogel membrane changed the EDL capacitance in ITO side to C'. Meanwhile, the surface area in the porous MNP electrode can change, with an area now q times (assume q=m+$\Delta$m) that of an aluminum foil (3×3 mm$^2$). Capacitance change in the MNP-hydrogel device was determined to be $$\Delta C = \left(\frac{m}{1+\frac{m}{25}}\right) \cdot \frac{1}{25}\varepsilon\varepsilon_0 \frac{A}{\kappa^{-1}} \left[\left(\frac{1+\frac{m}{25}}{m}\right)\left(\frac{q}{1+\frac{q}{25}}\right)\frac{\kappa^{-1}}{\kappa^{-1'}} - 1\right] \text{ or}$$

$$C = C_0\left[\left(\frac{1+\frac{m}{25}}{m}\right)\left(\frac{q}{1+\frac{q}{25}}\right)\sqrt{1+\frac{\Delta n_\infty}{n_\infty}} - 1\right]$$

where A is the electrode area of the ITO plate. Assuming $\Delta$m is much smaller than 25, then the above equation becomes $$\Delta C = C_0\left[\left(1+\frac{\Delta m}{m}\right)\sqrt{1+\frac{\Delta n_\infty}{n_\infty}} - 1\right],$$

where $\Delta$m/m is equal to the relative area change in the porous MNP electrode. By plugging in relative capacitance change ($\Delta C/C_0$) and ion concentration variations ($\Delta n_\infty/n_\infty$), the values of relative area change can be extracted, as shown in TABLE 1. In particular, as shown in TABLE 1, under compression, the deformable network of MNP experienced almost 18% increase in electrode area at the low salt concentration ($10^{-2}$ mM), but a moderate increase (5%) at the salt condition of 100 mM.

Example 5: Method of Detecting Underwater Acoustic Waves Using Sensor

In another example, a hydrogel device was placed inside a home-made metal mesh cage and immersed in water, by connecting the leads of the device with an external resistor (100 k$\Omega$) via a home-designed circuit (shown in FIG. 1) to convert capacitance change into voltage output. A computer program-controlled loudspeaker (Dayton Audio, DAEX25VT-4 Vented 25 mm Exciter 20W 4 Ohm) driven by an amplifier (Lepai, LP-2020A+Tripath TA2020 Class-T Hi-Fi Audio Amplifier) served as the acoustic wave generator, from which both frequencies and amplitudes were adjusted. An oscilloscope (Rigol DS1102E) was used to record the voltage output on the external resistor (100 k$\Omega$). For frequency sweeping and phase lag measurements, a network analyzer (Hewlett Packard 3577A) was used as both an acoustic wave generator and a signal receiver, with experimental data collected by a customized LabVIEW program.

Figure 7A:
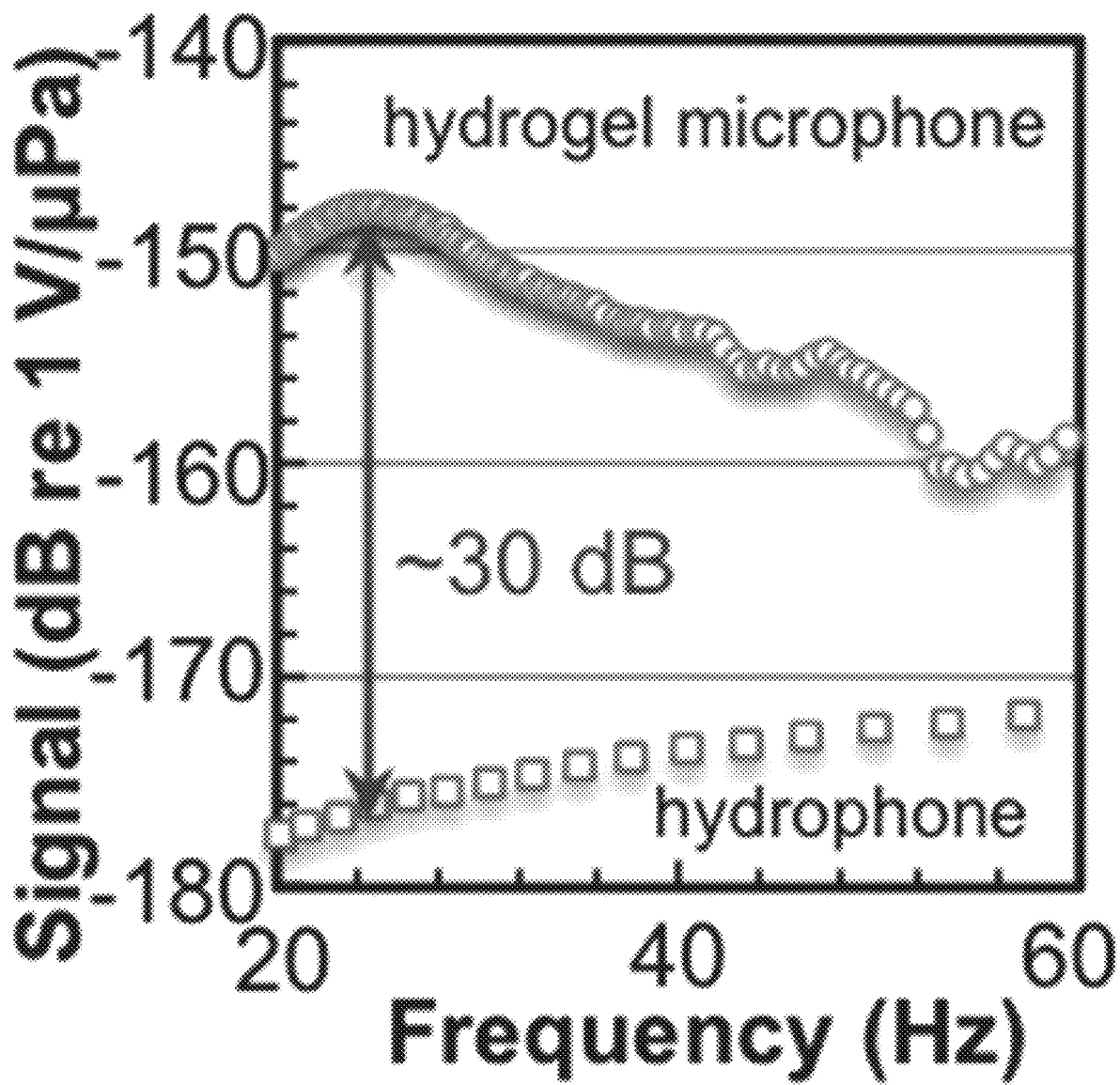
FIG. 7A shows a graph of voltage response to loads of varying frequencies for different sensing devices.

As the hydrogel matrix of the hydrogel sensor functioned as a transparent skeleton to underwater acoustic waves and as an ion reservoir, transient modulation of EDLs created a packet of ionic waves, moving from the MNP-planted side to the MNP-free side. As such, response of this hydrogel capacitor was not only sensitive to internal ion concentrations, but also differed from traditional dielectric or piezoelectric based devices by delivering an ionic wave-superimposed response every 55 Hz, a phase lag of 15 to 20 msec, as well as an unmatched performance at low frequencies. As shown in FIG. 7A, once the MNP-hydrogel sensor was electrically biased and operated under water, the MNP-hydrogel sensor device delivered 30 dB stronger signal at low frequencies compared to a commercial hydrophone. The graph of the signal delivered by the commercial hydrophone is labeled as "hydrophone" in FIG. 7A, whereas the graph of the signal delivered by the MNP-hydrogel sensor device is labeled as "hydrogel microphone" in FIG. 7A.

Figure 7B:
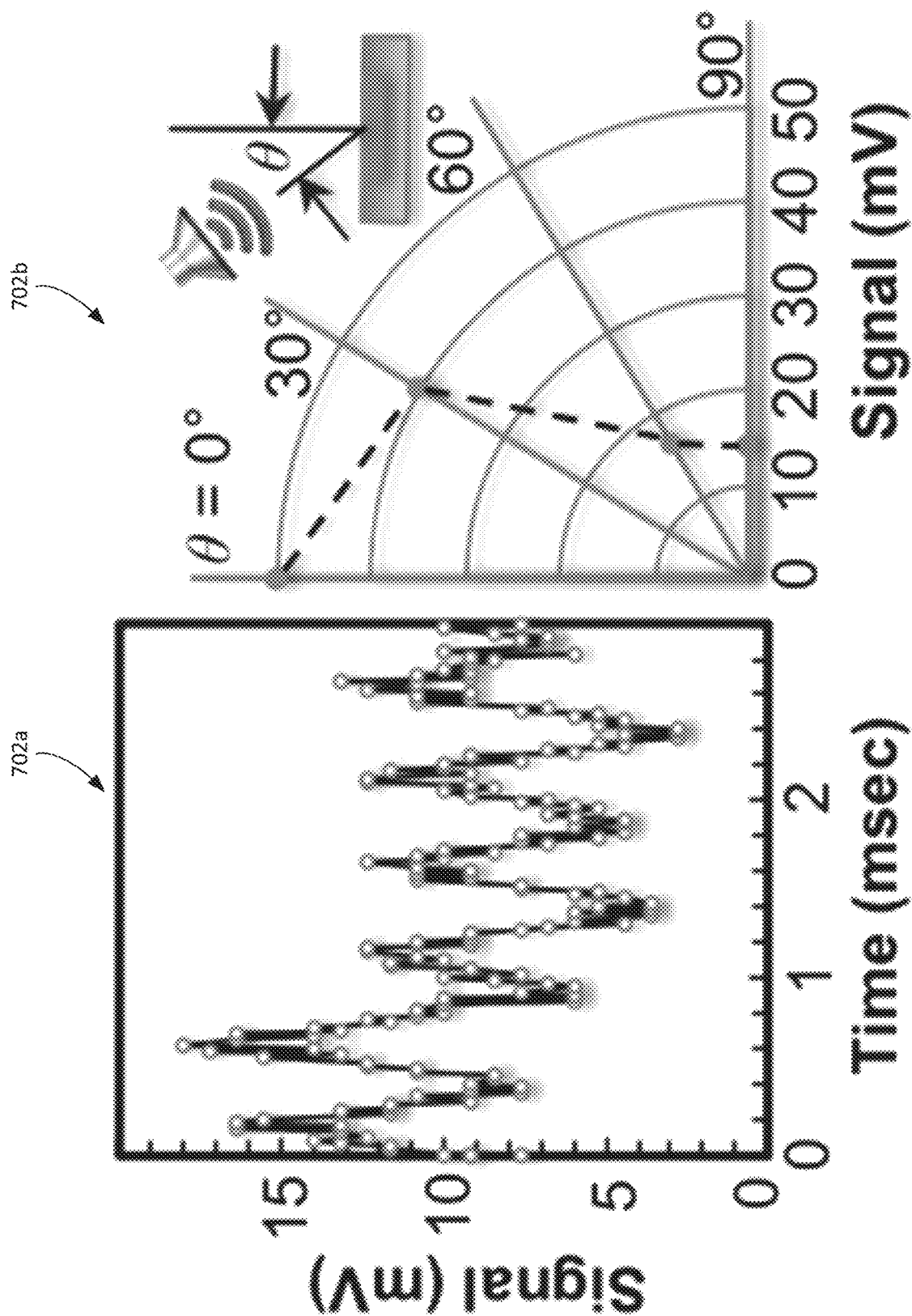
FIG. 7B shows, on the left, a graph of voltage response of a sensing device used underwater to detect a 2 kHz acoustic signal and, on the right, a graph of voltage response of the sensing device at different angles of incident of the acoustic signal.

As shown in panel 702a of FIG. 7B, device response could be extended to acoustic waves of kilohertz range. As shown in panel 702b of FIG. 7B, the directional response had a "FIG. 8" pattern with the maximum at normal incidence.

To determine the local sound pressure applied on the hydrogel microphone, a commercial hydrophone (SQ 26 Cetacean Research Technology, Seattle, Wash.) was used to replace the hydrogel device at the same location under identical acoustic impact conditions (settings controlled by the sound card on computer and the amplification ratio). Once voltage output from the hydrophone was recorded by an oscilloscope, sound pressure with unit of Pa was calculated using peak-to-peak voltage and sensitivity map of the hydrophone.

Figures 8A, 8B, 8C:
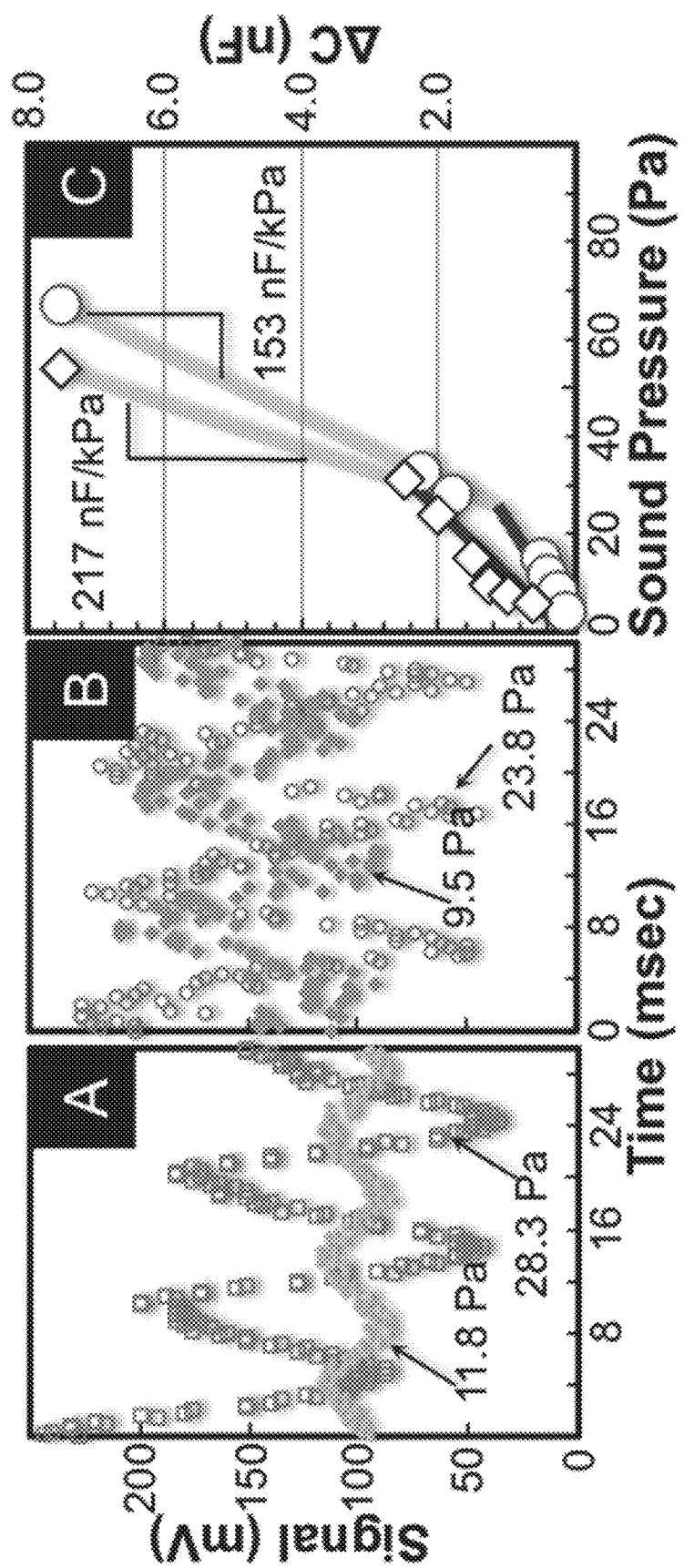
FIG. 8A shows a graph of a voltage response of a sensing device in a solution having an ion concentration of $10^{-2}$ mM.
FIG. 8B shows a graph of a voltage response of a sensing device in a solution having an ion concentration of 100 mM.
FIG. 8C shows a graph of capacitance responses of sensing devices at different pressures, the graph further depicting sensitivities of the sensing devices.

The high sensitivity of EDL capacitance to mechanical deformation enabled the hydrogel sensor to be used as an underwater microphone. In such a case, the mechanical deformation was induced by acoustic waves. The MNP-hydrogel device was soaked in water, and acoustic waves were allowed to penetrate into the gel membrane and therefore directly squeeze those MNP structures. FIG. 8A and FIG. 8B illustrate the effect of the acoustic on the capacitance in $10^{-2}$ mM and 100 mM ion concentration solutions, respectively. A larger sound pressure gave rise to an increased signal (voltage), with the gel of higher ion concentration more sensitive to low pressures, as shown in FIG. 8B. As the measured signal (mV) was from an oscilloscope and was due to a current flow through the external resistor (e.g., the external resistor having a resistance R=100 k$\Omega$ shown in FIG. 1), this voltage signal was converted into capacitance change ($\Delta$C).

Capacitance change ($\Delta$C) under dynamic load (underwater acoustic waves) was calculated by converting response (voltage output) into a current (i) flowing through the resistor ($R_f$):

$$V_0 = R_f \times i$$

where $V_0$ is the response (voltage output) of the hydrogel sensor that is treated as half of the peak-to-peak response ($V_{pp}/2$) and $R_f$ is the applied resistance shown in FIG. 1 (value of $10^5 \Omega$). Meanwhile, $$i = V\frac{\Delta C}{\Delta t},$$

where V is the applied voltage on the hydrogel sensor (1.0 V) and $\Delta$t as ¼ of a full cycle of the measured signal. At a sound input frequency of 100 Hz, the measured signal had a frequency of 100 Hz, returning a $\Delta$t of 2.5×10$^{-3}$ s. In this regard, the change in capacitance was calculated to be $\Delta C = 1.25 \times 10^{-8} V_{pp}$ (F). As shown in a graph 900 in FIG. 9A, the hydrogel microphone having an ion concentration of $10^{-2}$ mM had a response ($V_{pp}$) of 0.6 V under a sound pressure of 67 Pa (purple curve 902). Calculated $\Delta$C is then 7.5 nF. When sound pressure dropped to 28.3 Pa (red curve 904), showing a response ($V_{pp}$) of 0.144 V, capacitance change was then 1.8 nF. FIG. 9B is a graph 906 that shows the response of the hydrogel microphone having an ion concentration of 100 mM.

FIG. 8C shows a plot in which capacitance changes from both devices shown in FIG. 8A and FIG. 8B are calculated against a series of sound pressures, from 4 to 70 Pa. The performance of this hydrogel microphone fell within two regimes, with a higher sensitivity regime above a sound pressure of 30 Pa but lower sensitivity below this value. Even in the lower sensitivity regime, the hydrogel device responded with orders more capacitance change (nF) than dielectric ones (pF), primarily owing to the intrinsic large value of EDL capacitance and high acoustic coupling of the gel membrane to underwater sound. Interestingly, as the base value of the MNP-hydrogel device at a low ion concentration ($10^{-2}$ mM) is in the range of 3.0 nF, as shown in TABLE 1, a rather large relative capacitance change ($\Delta C/C_0 \sim 150\%$ @ 67 Pa) occurred, as shown in FIG. 8C. In particular, this capacitance change was larger than the capacitance change for the same device operated in air ($\Delta C/C_0 \sim 10\%$ @ 1.0 kPa, described herein with respect to Example 3). The device sensitivity in air (0.1 nF/kPa, described herein with respect to Example 3) can be compared to the device sensitivity in water. In particular, three orders higher sensitivity (217 nF/kPa) was measured using the device in water, suggesting the acoustic transparency of hydrogel to incoming sound waves in water. The MNP-hydrogel sensor device largely outperformed dielectric capacitive sensors having elastic pyramids (15.6 pF/kPa; device area of 64 mm$^2$) or silver nanowires (34.2 pF/kPa; area of 16 mm$^2$). In comparison to energy generators of piezoelectric mechanism, even though the MNP-hydrogel sensor device operated as an energy storage device, it provided an extremely large output in electric charge (24 µC/N) once perturbed by external loads whereas crystal of Pb(Mg⅓Nb⅔)O$_3$-PbTiO$_3$ had the highest piezoelectric coefficient of 2.8 nC/N (device area of 16 mm$^2$).

Figure 8D:
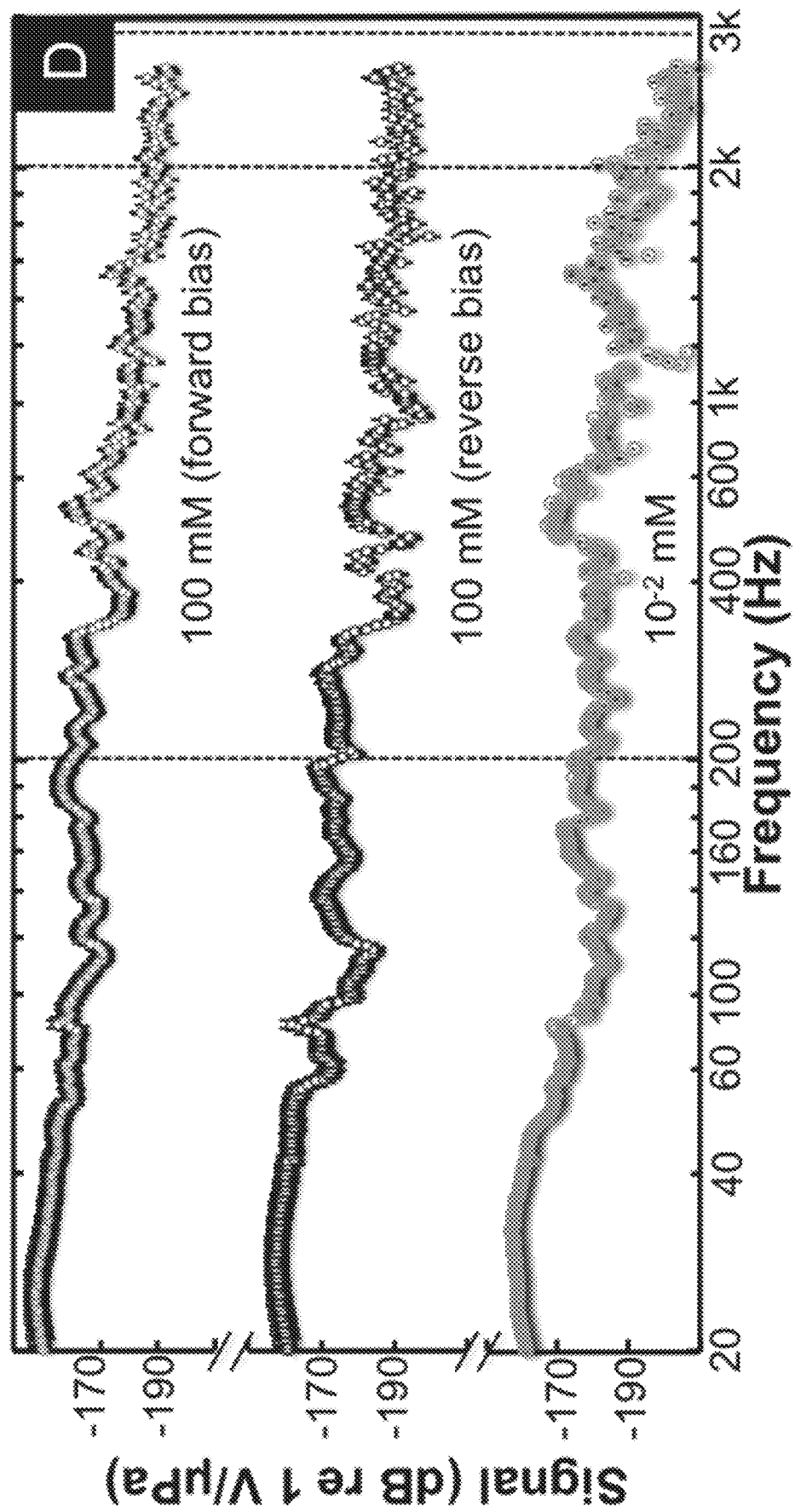
FIG. 8D shows graphs of frequency responses of sensing devices from 20 Hz to 3 kHz, the sensing devices in solutions of varying ion concentrations.

The MNP was surrounded by a hydrogel network that was denser, e.g., 3.0 M monomer concentration, than some traditional hydrogel networks, e.g., having a 1.0 monomer concentration. Under a high frequency pressure wave, a relatively dense network may not be able to keep up with the deformation pace of metal particles. As such, the deformation of MNP and the hydrogel network can be analogized to a mass, spring, and damper system. The device response over a broad frequency can influence the parameters for these two structural units. FIG. 8D shows a response of this hydrogel microphone (amplitude of signal as decibel (dB)) toward sound of broad frequencies that is recorded by a network analyzer. FIG. 8D shows the frequency response of the hydrogel microphone from 20 Hz to 3 kHz. Error bars (95% confidence) represented the variation of measurements due to sound interference inside the water tank. A relatively flat response of −152 dB from 20 to 600 Hz was observed for device with a high ion concentration (100 mM), accompanied by the signal gradually approaching the noise level of −195 dB at 3 kHz. However, when the bias for this microphone was reversed (copper negative and ITO positive), the device performance dropped, with a weaker response of −160 dB (20-600 Hz) and then a noise level of −195 dB even at 2 kHz. This latter measurement indicated a level of asymmetry or anisotropy from the hydrogel microphone. In particular, in this example, cations at the MNP side apparently were less favored toward additional EDL buildup. Since this type of anisotropy can be also found in some ion selective membranes and can be interpreted as increased internal resistance for the motion of cations, the results suggest that energy conversion efficiency from a mechanical one (sound wave) to an electrical one (capacitance) could be hindered. For low ion concentration ones ($10^{-2}$ mM), the device started rather similarly with a flat response of −165 dB (20-600 Hz) then dropped to a noise level of −200 dB at 3 kHz. A simple vibration model with a mass, a spring, and a damper suggested both the MNP and hydrogel network structure play important roles in governing the response of the hydrogel microphone at higher frequencies.

Example 6: Analytical Model of Capacitive Sensor

The response of the hydrogel microphone, e.g., the microphone used in Example 5, was computationally modeled. The responses of the hydrogel microphone at different acoustic loads were modeled using a mass, spring, and damper model in which the mass, the spring, and the damper are connected in parallel. A dynamic load such as an acoustic wave, in this model, produced a vibration of those combined elements at a given frequency. A solution of the vibrational displacement (X) is $(F_0/k)/\sqrt{(1-r^2)^2+(2\varsigma r)^2}$, where $F_0$ is the amplitude of the incoming acoustic wave, k the spring constant, r the ratio of input frequency (f) vs. natural vibrational frequency ($f_n$) of the system, and ç is the damping coefficient.

In this solution, appropriate parameters such as $F_0/k$, $f_n$, and ç were selected to fit the experimental results shown in FIG. 8D. The shape of each curve, for example, was defined by the last two parameters but the magnitude by the first parameter. To fit three situations shown in FIG. 8D, both the parameters $f_n$ and ç were kept at the same value ($f_n$=350 Hz and ç=0.5), but with different values of $F_0/k$. Fits were all plotted as black curves overlapping the experimental data as shown in FIGS. 10A to 10C. Particularly, the curve shown in FIG. 10A (100 mM) has a $F_0/k$ value of 70, the curve shown in FIG. 10B (100 mM; copper positive and ITO negative biased) has a $F_0/k$ value of 48, and the curve shown in FIG. 10C ($10^{-2}$ mM; copper negative and ITO positive biased) has a $F_0/k$ value of 40. Because the MNP structure and hydrogel matrix remained the same in all three situations, from these numbers, it can be inferred that the ion concentration or the biasing directions changed the value of spring constant (1/k), with the MNP structure and polymer network respectively for natural frequency ($f_n$) and damping coefficient (ç).

Example 7: Time Delay for Capacitive Sensor

Figures 8E, 8F:
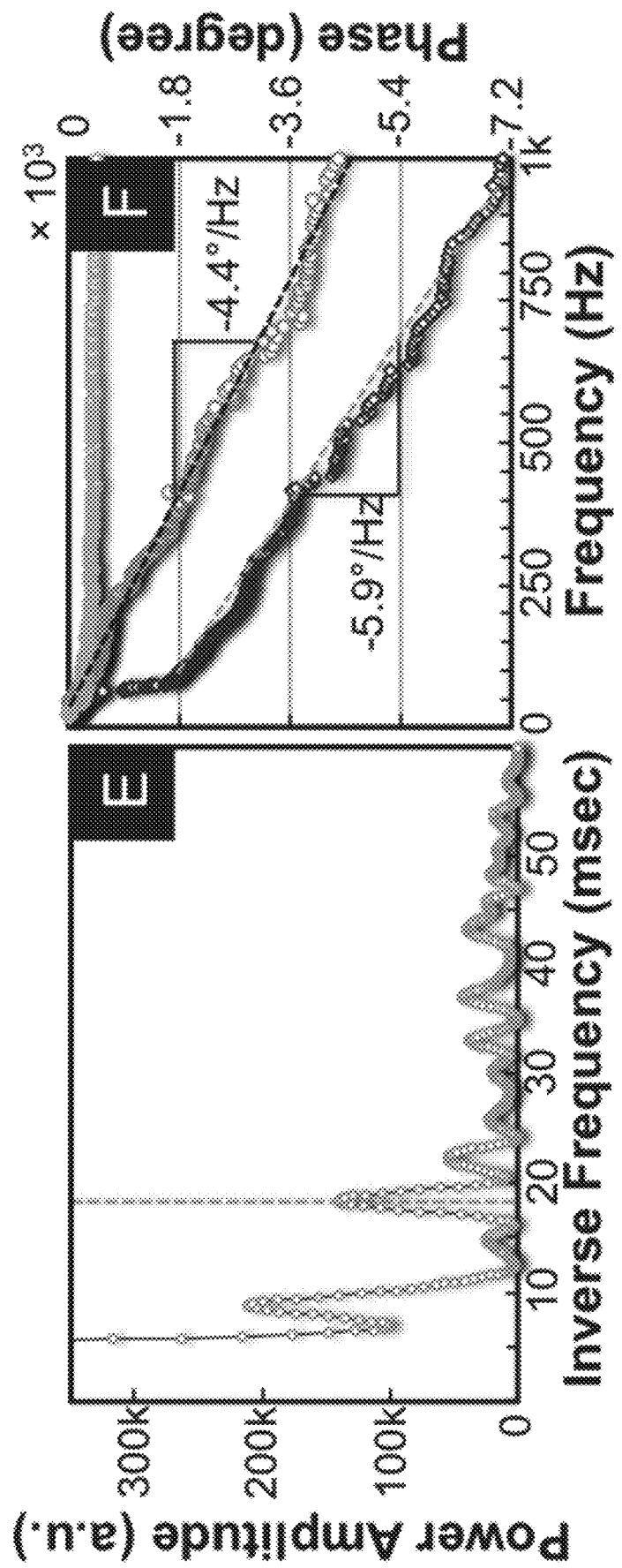
FIG. 8E shows a graph of a Fourier transform of a frequency response of a sensing device.
FIG. 8F shows a graph of phase curves of the sensing device.

Turning back to FIG. 8D, the deviation from the ideal flat band response described in Example 5 had a periodicity apparent after performing a Fourier transform on the frequency response, as shown in FIG. 8E. In addition to the trend of decreasing response towards higher frequencies, small fluctuations were observed. If a linear frequency axis was used, the fluctuation was periodic. Indeed, as shown in FIG. 8E, a Fourier transform of the frequency response curve exhibited a prominent peak at ~18 ms corresponding to ~55 Hz periodicity. Peaks to the left of this one represented DC or slowly varying components as described herein. In this example, these peaks could be caused by interference of waves residing in the hydrogel, similar to optical Fabry-Pérot interference. The nature of these waves were not acoustic, as the wave velocity of these waves was determined to be ~0.055 m/s (using Fabry-Perot interference equation, wave velocity is the hydrogel thickness of 1 mm times the frequency periodicity of 55 Hz).

The existence of this slowly propagating wave was confirmed by phase curves of the hydrogel microphone in FIG. 8F (note a linear scale of frequency is used) with near constant negative slopes, indicating a time delay. From the magnitude of the slopes, time delays of 15~20 ms were extracted, corresponding to a wave velocity of 0.05~0.067 m/s. This time delay, again, was not caused by the sound propagation time which is estimated to be less than 0.1 ms, as can be seen in the hydrophone measurement which had nearly zero slope (a sudden phase change near ~50-100 Hz is attributed to passing the resonating frequency of hydrophone and loudspeaker, respectively). In this example, an ion concentration wave may have caused such a delay and the previous fluctuations in the response curve. Possibly, ion concentrations were quickly modulated by acoustic waves that changed the surface area of the silver nanoparticle electrode. These ion concentrations may not have immediately induced electrical current until the perturbation of the ion concentration reached the counter electrode that the resistor was connected to.

A crude model of such a delay was formulated. The delay was related to the ion concentration in hydrogel. To explain the delay specific to the hydrogel microphone, the wave was determined to be a slow-propagating wave with linear dispersion (so velocity is constant). This wave can be regarded as an ion concentration wave, so that when the electrically grounded side of the hydrogel sensor generates an ion concentration variation due to the incoming sound waves, a periodical disturbance of the ion concentration will propagate towards the biased side of the hydrogel, causing charge variation on the amplifier input.

In this model, due to the ion mean free time scale being much shorter than the hydrogel device response time scale, it is assumed there is a constant ion velocity under external electrical field E, so that an electrical mobility $\mu$ in hydrogel is established in which the drift velocity v of ion is $v_{drift}=\mu E$.

The concentration variation in the hydrogel membrane results in a diffusion velocity:

$$v_{diffusion}=k_D \nabla n.$$

Under a constant bias voltage at steady state, a leak current through hydrogel established a constant electric field inside the gel. The ion velocity is determined to be zero because the total ion number stays constant and ions cannot recombine at the electrodes as long as the bias voltage is smaller than the electrolysis voltage. The following equation thus holds true:

$$k_D \nabla n - \mu E = 0.$$

A plane wave solution with wave vector in the thickness direction of the hydrogel is determined. First, we drop the vector mark and use notation $v_1 e^{i(kx-\omega t)}$, where $e^{i(kx-\omega t)}$ represents propagating plane wave. A constant bias voltage is applied along the thickness direction of the hydrogel, so E can be divided into two parts: $E_0+E_1 e^{i(kx-\omega t)}$, where $E_0$ is the constant bias and $E_1$ term is the ion concentration variation caused additional electrical field. Note v, $E_1$ can be complex here to denote the phase factor. Here diffusion velocity caused by the concentration gradient is treated as a constant velocity $v_0$ balancing drift velocity and the equation becomes $$v_0+v_1 e^{i(kx-\omega t)}-\mu E_0-\mu E_1 e^{i(kx-\omega t)}=0$$

or $v_0=\mu E_0$, and $v_1-\mu E_1=0$.

Here the terms with time dependence are separated with terms without time dependence. The continuity equation is derived based on the condition that the total ion number stays constant:

$$\frac{\partial n}{\partial t}+n\nabla \cdot v + v \cdot \nabla n = 0.$$

Again the ion concentration n can be decomposed into two parts: $n=n_0+n_1 e^{i(kx-\omega t)}$, where the $n_0$ term is the unperturbed ion concentration, and the $n_1$ term represents the perturbed concentration (note $n_1$ can be complex to include the phase factor). The continuity equation is reduced to:

$$n_0 v_1 + (v_0-\omega/k)n_1 = 0.$$

The electrical field generated by charged ions is described by Gauss's Law:

$$-\frac{q}{\epsilon_0}n + \nabla \cdot E = 0.$$

Using plane wave assumption on E and n, assuming a charge neutral hydrogel body, the following equation is determined:

$$-\frac{q}{\epsilon_0}n_1 + ikE_1 = 0.$$

Based on the foregoing, the equation for $n_1$ is derived to be:

$$-\frac{q}{\epsilon_0}n_1 + i\frac{k}{\mu n_0}\left(\frac{\omega}{k}-\mu E_0\right)n_1 = 0 \text{ or}$$

$$k = \frac{1}{\mu E_0}\omega + i\frac{qn_0}{E_0 \epsilon_0}.$$

The second term in this equation is imaginary and describes the attenuation of the plane wave as it propagates. The first term is the propagation term. The group velocity of propagation is $$v_g = \frac{\partial \omega}{\partial k} = \mu E_0.$$

The bias field is on the order of 0.2 V over 1 mm thickness ($10^2$ V/m), ion mobility for sodium in water is on the order of $2 \times 10^{-4}$ m$^2$V$^{-1}$s$^{-1}$. The ion concentration wave is therefore estimated to propagate with a velocity on the order of 0.04 m/s. Going across the 1 mm thickness would take ~25 ms, which agrees with the experimental results on the order of magnitude.

Example 8: Calibrating Sensing Devices

In the examples described herein, a commercial listening device (hydrophone, SQ 26-07) with known sensitivity was used to calibrate the sound pressure for experiments. First, acoustic wave at 100 Hz was fixed by setting the volume of the loudspeaker and parameters on the amplifier. Then this sound was applied through a water tank and received by the SQ 26-07 hydrophone, with the voltage output from the hydrophone recorded by an oscilloscope. Since sensitivity (S) of hydrophone is given by:

$$S = 20\log_{10}\frac{V_{RMS}}{V_0},$$

where S can be found in FIG. 11B at a specific frequency (for example, S=−169 @ 100 Hz), $V_{RMS}$ is the root-mean-square voltage signal from oscilloscope, and $V_0$ is the reference voltage (1.0 V ref. 1 µPa). Then, $V_{RMS}$ can be calculated from experimental data by converting the peak-to-peak voltage ($V_{pp}$):

$$V_{RMS} = \frac{V_{pp}}{2\sqrt{2}}$$

Based on the sensitivity (S) and recorded $V_{RMS}$, $V_0$ can then be calculated. Since each 1.0 V of $V_0$ corresponds to 1 µPa of pressure, a different $V_0$ is used to determine the sound pressure other than the reference level. For example, FIG. 11A shows a $V_{pp}$ of 0.32 V, giving us a value of $V_0$ of $0.33 \times 10^8$ V. The calculated sound pressure at this 100 Hz will be 33 Pa. Now, this same acoustic wave was applied to the hydrogel sensor, plus a few other sounds at different intensities. The voltage of these acoustic waves was measured with an oscilloscope, as shown in FIG. 11D. As the acoustic wave back in FIG. 11A delivered a peak-to-peak voltage of 5.6 V in FIG. 11C, then the other acoustic waves at other intensities can be calculated by scaling their voltage output vs. 5.6 V.

ALTERNATIVE IMPLEMENTATIONS

A number of implementations have been described. Nevertheless, it will be understood that various modifications may be made. Accordingly, other implementations are within the scope of the claims. For example, the bias voltage applied to the hydrogel structure, the material used to form the hydrogel, the process conditions for fabricating the hydrogel, and the circuit used to generate an output signal representing a physical load (e.g., an acoustic signal, an airflow, or a touch) detected by the hydrogel sensor can be different from those described above.

What is claimed is:
1. A device comprising:
  a capacitive sensor comprising:
    a hydrogel structure comprising a first surface and a second surface;
    a first electrode at the first surface of the hydrogel structure, the first electrode comprising a network of metal nanoparticles extending into the hydrogel structure; and
    a second electrode at the second surface of the hydrogel structure;
    wherein the network of metal nanoparticles extends from the first electrode toward the second electrode but does not contact the second electrode.
2. The device of claim 1, wherein the hydrogel structure comprises a cross-linked and hydrophilic polymer.
3. The device of claim 1 in which the network of metal nanoparticles is deformable in response to changes in the hydrogel structure.
4. The device of claim 1 in which the network of metal nanoparticles comprises at least one of tree-like or dentritic structures that have branches, and electric double layers are formed between the branches.
5. The device of claim 4 in which the capacitive sensor has electric double layer capacitances that change as the network of metal nanoparticles is deformed due to a change in the hydrogel structure.
6. The device of claim 1, wherein the first surface and the second surface of the hydrogel structure define a thickness between 0.1 mm and 5 mm.
7. The device of claim 1, wherein the first electrode comprises a terminal positioned on and extending along the first surface of the hydrogel structure, the terminal being electrically coupled to the network of metal nanoparticles.
8. The device of claim 7, wherein the terminal comprises copper.
9. The device of claim 1, wherein the network of metal nanoparticles extends from the first surface into the hydrogel structure a depth of 2 to 3 micrometers.
10. The device of claim 1, wherein the network of metal nanoparticles extends toward the second electrode away from the first surface.
11. The device of claim 1, wherein the network of metal nanoparticles comprises a metal ion selected from the group consisting of Ag+, Ni2+, Au+, and Pd+.
12. The device of claim 1, wherein the second electrode comprises a conductive material selected from the group consisting of aluminum, indium tin oxide, and graphene.
13. The device of claim 1, wherein the capacitive sensor comprises a static compressive load sensitivity of at least 0.1 nF/kPa in air or at least 217 nF/kPa in water.
14. The device of claim 1, wherein the capacitive sensor has a response magnitude to an acoustic signal between 20 Hz to 60 Hz of at least −150 dB.
15. The device of claim 1 in which the hydrogel structure comprises at least 50% water content by volume.
16. The device of claim 1, comprising an array of the capacitive sensors configured to detect a contour of a shaped contact.
17. The device of claim 16 in which the array of capacitive sensors share a common hydrogel structure, and different capacitive sensors comprise different first electrodes that are disposed at different regions of the first surface of the hydrogel structure.
18. The device of claim 1, comprising a hydrogel microphone that comprises:
  the capacitive sensor;
  a voltage source configured to provide a bias voltage to the first and second electrodes of the capacitive sensor; and
  output nodes configured to generate an output signal that varies in response to changes in a capacitance of the capacitive sensor.
19. The device of claim 1 in which the capacitive sensor comprises a static compressive load sensitivity of at least 217 nF/kPa in water.
20. The device of claim 1 in which the capacitive sensor is configured such that a capacitance of the capacitive sensor varies in response to variations in a pressure applied to the first surface of the hydrogel structure.
21. The device of claim 1 in which the first electrode comprises a cathode, the second electrode comprises an anode.
22. The device of claim 1 in which the network of metal nanoparticles comprises at least one of deformable tree-like or deformable dentritic structures that have branches formed of metal nanoparticles, and electric double layers are formed between the branches of the metal nanoparticles.

23. A hydrogel microphone comprising:
a capacitive sensor comprising:
a hydrogel structure comprising a first surface and a second surface;
a first electrode at the first surface of the hydrogel structure, the first electrode comprising a network of conductive particles extending into the hydrogel structure; and
a second electrode at the second surface of the hydrogel structure;
wherein the network of conductive particles extends from the first electrode toward the second electrode but does not contact the second electrode;
a voltage source configured to provide a bias voltage to the first and second electrodes of the capacitive sensor; and
output nodes configured to generate an output signal that varies in response to changes in a capacitance of the capacitive sensor.

24. The hydrogel microphone of claim 23 in which the bias voltage is a DC voltage.

25. The hydrogel microphone of claim 23 in which the network of conductive particles comprises a network of metal nanoparticles.

26. The hydrogel microphone of claim 25 in which the network of metal nanoparticles comprises metal ions selected from the group consisting of Ag+ ions, Ni2+ ions, Au+ ions, and Pd+ ions.

27. The hydrogel microphone of claim 23 in which the capacitive sensor has a capacitance across the first electrode and the second electrode, and the capacitive sensor is configured such that the capacitance varies in response to variations in a pressure applied to the first surface of the hydrogel structure.

28. The hydrogel microphone of claim 23 in which the network of conductive particles comprises at least one of deformable tree-like or deformable dentritic structures that have branches, and electric double layers are formed between the branches, and
wherein the at least one of deformable tree-like or deformable dentritic structures are configured to increase a capacitance of the capacitive sensor such that the capacitive sensor having the at least one of deformable tree-like or deformable dentritic structures has a larger capacitance that if the capacitive sensor does not have the at least one of deformable tree-like or deformable dentritic structures.

29. The hydrogel microphone of claim 28 in which the network of conductive particles comprises at least one of deformable tree-like or deformable dentritic structures that have branches formed of metal nanoparticles, and electric double layers are formed between the branches of the metal nanoparticles.

30. The hydrogel microphone of claim 23 in which the network of conductive particles comprises at least one of deformable tree-like or deformable dentritic structures that have stems and branches, each stem having a first end connected to the first electrode and a second end connected to two or more branches, and each branch has a first end connected to a corresponding stem and a second end extending into the hydrogel.

31. The hydrogel microphone of claim 23 in which the capacitive sensor has electric double layer capacitances that change as the network of conductive nanoparticles is deformed due to a change in the hydrogel structure.

32. The hydrogel microphone of claim 23 in which the capacitive sensor comprises a static compressive load sensitivity of at least 217 nF/kPa in water.

33. The hydrogel microphone of claim 23 in which the capacitive sensor has a response magnitude to an acoustic signal between 20 Hz to 60 Hz of at least −150 dB.

34. The hydrogel microphone of claim 23, comprising an array of the capacitive sensors configured to detect a contour of a shaped contact.

35. An apparatus comprising:
a capacitive sensor comprising:
a hydrogel structure;
a cathode comprising a network of metal nanoparticles extending into the hydrogel structure, in which the network of metal nanoparticles is formed by introducing ionic precursors into the hydrogel and causing metal ions in the ionic precursors to form the network of metal nanoparticles; and
an anode that contacts the hydrogel structure, in which the network of metal nanoparticles extends from the cathode toward the anode but does not contact the anode.

36. The apparatus of claim 35 in which the network of metal nanoparticles comprises at least one of deformable tree-like or deformable dentritic structures that have stems and branches formed of metal nanoparticles.

37. The apparatus of claim 35, comprising an array of the capacitive sensors configured to detect a contour of a shaped contact, in which the array of capacitive sensors share a common hydrogel structure, and different capacitive sensors comprise different first electrodes that are disposed at different regions of the first surface of the hydrogel structure.

* * * * *